(12) United States Patent
Kondou

(10) Patent No.: US 10,168,243 B2
(45) Date of Patent: Jan. 1, 2019

(54) LEAKAGE DETECTOR, LEAKAGE DETECTION METHOD, AND PIPE NETWORK MONITORING APPARATUS

(71) Applicant: SEKISUI CHEMICAL CO., LTD., Osaka-shi, Osaka (JP)

(72) Inventor: Hiroaki Kondou, Kyoto (JP)

(73) Assignee: SEKISUI CHEMICAL CO., LTD., Osaka-shi, Osaka (JP)

( * ) Notice: Subject to any disclaimer, the term of this patent is extended or adjusted under 35 U.S.C. 154(b) by 196 days.

(21) Appl. No.: 14/430,413

(22) PCT Filed: Sep. 20, 2013

(86) PCT No.: PCT/JP2013/075464
§ 371 (c)(1),
(2) Date: Mar. 23, 2015

(87) PCT Pub. No.: WO2014/046237
PCT Pub. Date: Mar. 27, 2014

(65) Prior Publication Data
US 2015/0247777 A1    Sep. 3, 2015

(30) Foreign Application Priority Data

Sep. 24, 2012 (JP) .................................. 2012-209316
Mar. 4, 2013 (JP) .................................. 2013-041449
(Continued)

(51) Int. Cl.
G01M 3/24 (2006.01)
F17D 5/06 (2006.01)
G01P 13/00 (2006.01)

(52) U.S. Cl.
CPC ............... *G01M 3/243* (2013.01); *F17D 5/06* (2013.01); *G01P 13/0073* (2013.01)

(58) Field of Classification Search
CPC .. G01N 29/14; G01N 29/2437; G01N 29/245; G01N 2291/0422;
(Continued)

(56) References Cited

U.S. PATENT DOCUMENTS 3,673,857 A * 7/1972 Teitelbaum ............ G01M 3/243
                                                      73/40.5 A
3,869,534 A * 3/1975 Yoshikawa ................ C08J 5/18
                                                      264/210.1
(Continued)

FOREIGN PATENT DOCUMENTS

CN    102412757 A    4/2012
EP    1 519 165 A2    3/2005
(Continued)

OTHER PUBLICATIONS

Communication dated Sep. 10, 2016 from the Australian Patent Office in counterpart Australian application No. 2013318975.
(Continued)

*Primary Examiner* — John Fitzgerald
*Assistant Examiner* — Truong D Phan
(74) *Attorney, Agent, or Firm* — Sughrue Mion, PLLC

(57) ABSTRACT

Provided is a leakage detector which is capable of exhibiting high sensitivity to vibration-sounds caused by water leakage from a synthetic resin pipe and thus setting an installation span longer to thereby make it possible to more efficiently perform a water leakage inspection for a synthetic resin pipe. The leakage detector (6) comprises a base (21), a piezoelectric element (9) supported by the base (21) and configured to convert vibration-sounds to an electric signal, and a weight member (28) loaded against the piezoelectric element (9). The piezoelectric element (9) is made of a polymeric piezoelectric material. One end of the piezoelectric element (9) is supported by an upper end of a support post (27), and the
(Continued)

weight member (28) is loaded against the other end of the piezoelectric element (9).

18 Claims, 11 Drawing Sheets

(30) Foreign Application Priority Data

May 10, 2013 (JP) ................................. 2013-099943
May 10, 2013 (JP) ................................. 2013-099949

(58) Field of Classification Search
CPC ............ G01N 2291/2634; G01M 3/24; G01M 3/243; G01M 3/005; F17D 5/06; G01P 13/0073; H01L 41/193; H01L 41/08; G01H 1/00; B06B 1/0622; B06B 1/0688; G10K 11/02; H04R 17/00; H04R 17/005
USPC ...... 73/40.5 A, 587, 592; 310/334, 800, 328
See application file for complete search history.

(56) References Cited

U.S. PATENT DOCUMENTS

| | | | |
|---|---|---|---|
| 4,015,319 A * | 4/1977 | Levine | B06B 1/0603 29/25.35 |
| 4,330,730 A * | 5/1982 | Kurz | H01L 41/094 310/330 |
| 4,368,525 A | 1/1983 | Obata et al. | |
| 4,560,737 A * | 12/1985 | Yamamoto | C08L 27/16 264/288.4 |
| 4,591,465 A * | 5/1986 | Miyata | C08J 5/18 264/234 |
| 4,736,763 A | 4/1988 | Britton et al. | |
| 5,029,474 A * | 7/1991 | Schulze | G10K 11/02 73/587 |
| 5,524,491 A * | 6/1996 | Cavalloni | G10K 11/02 73/587 |
| 5,602,327 A | 2/1997 | Torizuka et al. | |
| 6,135,969 A * | 10/2000 | Hale | A61B 5/02411 600/595 |
| 6,178,246 B1 * | 1/2001 | Bebesel | G10K 11/1788 381/71.11 |
| 6,336,366 B1 | 1/2002 | Thundat et al. | |
| 6,453,247 B1 * | 9/2002 | Hunaidi | G01M 3/243 702/51 |
| 6,567,006 B1 * | 5/2003 | Lander | G01M 3/243 340/605 |
| 7,739,899 B1 * | 6/2010 | Holland | G01M 3/24 73/40.5 R |
| 2006/0219016 A1 * | 10/2006 | Wang | G01H 1/00 73/652 |
| 2009/0036779 A1 * | 2/2009 | Fukuda | A61B 8/14 600/459 |
| 2010/0076714 A1 * | 3/2010 | Discenzo | H02N 2/181 702/104 |
| 2010/0181871 A1 * | 7/2010 | Daniel | G01L 1/16 310/338 |
| 2011/0016930 A1 * | 1/2011 | Moon | D06F 58/10 68/5 C |
| 2012/0007743 A1 * | 1/2012 | Solomon | G01M 3/243 340/605 |

FOREIGN PATENT DOCUMENTS

| | | |
|---|---|---|
| JP | 52-140374 A | 4/1976 |
| JP | 59-31421 A | 2/1984 |
| JP | 59-035112 A | 2/1984 |
| JP | 59-038239 A | 3/1984 |
| JP | 59-097299 A | 6/1984 |
| JP | 62-28843 B2 | 6/1987 |
| JP | 62-29931 Y2 | 8/1987 |
| JP | 2-3145 Y2 | 1/1990 |
| JP | 3194078 B2 | 7/2001 |
| JP | 3223337 B2 | 10/2001 |
| JP | 2001-319284 A | 11/2001 |
| JP | 2003-294718 A | 10/2003 |
| JP | 2005-296431 A | 10/2005 |
| JP | 2010-267906 A | 11/2010 |
| WO | 94/23242 A1 | 10/1994 |
| WO | 2012/026273 A1 | 3/2012 |
| WO | 2012/101646 A1 | 8/2012 |
| WO | WO 2012101646 A1 * | 8/2012 ............ G01M 3/243 |

OTHER PUBLICATIONS

Wang, Q., et al., "The research of oil pipeline leak detection and location based on PVDF piezoelectric sensors", Advanced Materials Research, vols. 301-303, 2011, pp. 1273-1277 (7 pages).
Communication dated May 19, 2016 from the European Patent Office in counterpart European application No. 13839205.5.
International Search Report for PCT/JP2013/075464 dated Nov. 5, 2013 [PCT/ISA/210].
Communication dated Jun. 12, 2017, from the State Intellectual Property Office of the P.R.C. in counterpart Chinese application No. 201380049680.X.
Communication dated Apr. 7, 2015 from the Japanese Patent Office in counterpart Japanese application No. 2013-099943.
Communication dated Apr. 14, 2015 from the Japanese Patent Office in counterpart Japanese application No. 2013-041449.
Communication dated Aug. 18, 2015 from the Japanese Patent Office in counterpart Japanese application No. 2013-041449.
Communication dated Dec. 6, 2016 from the Japanese Patent Office in counterpart Japanese application No. 2013-099949.
Communication pursuant to Article 94(3) EPC, dated Dec. 7, 2017, issued in corresponding EP Application No. 13839205.5, 8 pages.

* cited by examiner

Fig. 5
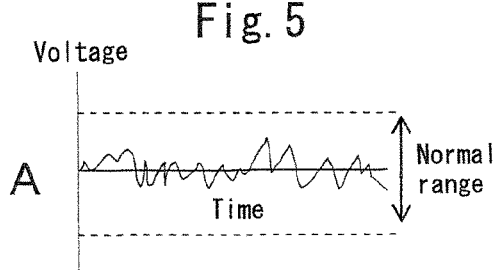
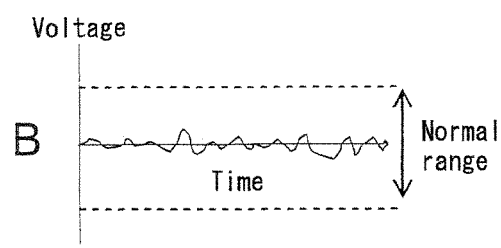
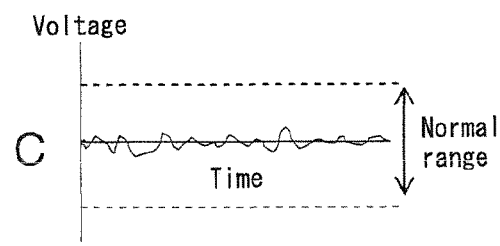
Fig. 6
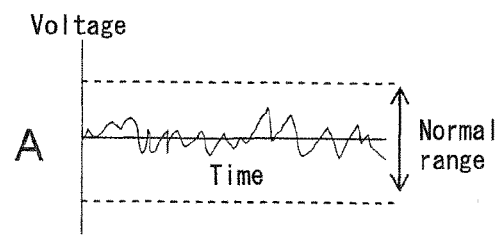
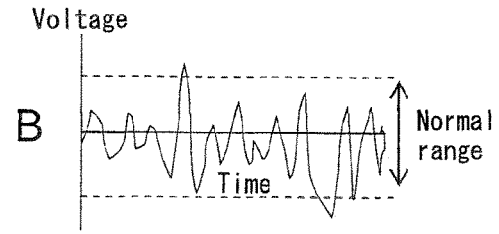
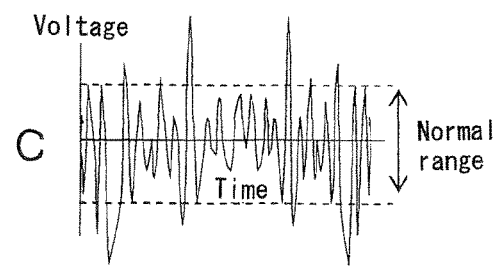

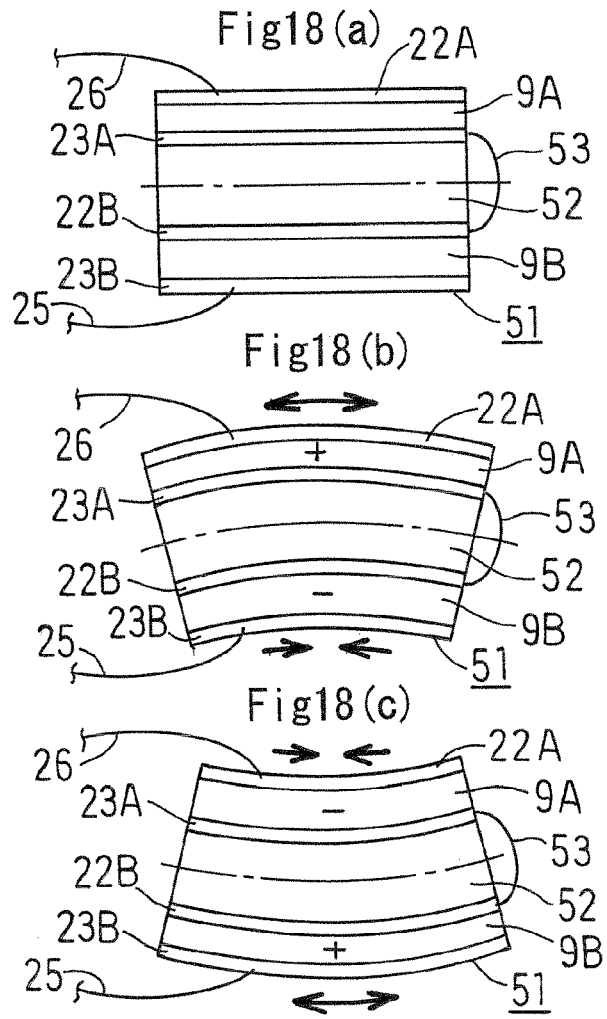
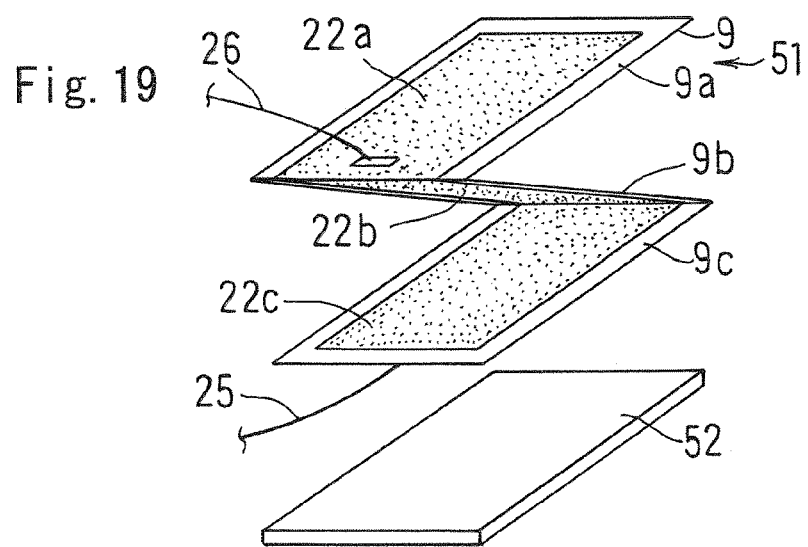

LEAKAGE DETECTOR, LEAKAGE DETECTION METHOD, AND PIPE NETWORK MONITORING APPARATUS

CROSS REFERENCE TO RELATED APPLICATIONS

This application is a National Stage of International Application No. PCT/JP2013/075464, filed on Sep. 20, 2013, which claims priority from Japanese Patent Application Nos. 2012-209316, filed on Sep. 24, 2012, 2013-041449, filed on Mar. 4, 2013, 2013-099943, filed on May 10, 2013, 2013-099949, filed on May 10, 2013, the contents of all of which are incorporated herein by reference in their entirety.

TECHNICAL FIELD

The present invention relates to a leakage detector, a leakage detection method, and a pipe network monitoring apparatus, and, more particularly, to a leakage detector capable of accurately detecting fluid leakage in various pipelines including tap water pipeline, building pipeline and industrial pipeline, a leakage detection method using such a leakage detector, and a pipe network monitoring apparatus for performing flow rate monitoring, abnormality detection or the like in various pipe networks including tap water pipeline, gas pipeline, building pipeline and industrial pipeline, by using such a leakage detector.

BACKGROUND ART

Heretofore, it has been commonly performed to detect by a sensor vibration of a tap water pipe caused by water leakage therefrom. For example, Patent Document 1 discloses a leakage detector in which a detection unit incorporating a piezoelectric element and a base made of a rigid material are coupled together through a rubber material. This Patent Document mentions that a low-frequency vibration transmitting through a synthetic resin pipe can be amplified by means of resonance. It also mentions that a leakage location can be identified by installing two detectors in a fire hydrant or the like provided in a tap water pipeline, and analyzing an obtained correlation waveform.

Further, there has heretofore been a system capable of managing a flow rate at a remote location, such as a centralized meter reading system for tap water in a multi-dwelling or the like. For example, Patent Document 2 discloses a wireless meter reading system configured to eliminate needless receiving in a child wireless device to thereby extend battery life. This system is designed to wirelessly transmit information about flow rate to a remote location by using a battery.

Patent Document 3 discloses a pipe inspection apparatus using a piezoelectric ultrasonic transducer. This technique makes it possible to inspect a laying state of lining from outside a pipe.

LIST OF PRIOR ART DOCUMENTS

Patent Documents

Patent Document 1: JP 3223337 B
Patent Document 2: JP 2001-319284 A
Patent Document 3: JP 2003-294718 A

SUMMARY OF THE INVENTION

Technical Problem

The leakage detector disclosed in the Patent Document 1 is insufficient in terms of sensitivity to minute vibration-sounds in a synthetic resin pipe, so that an installation span of two detectors to be installed in a fire hydrant or the like is relatively short. Thus, there is a problem that an extensive water leakage inspection requires a lot of effort.

The pipe network monitoring apparatus disclosed in the Patent Document 2 employs a battery, so that it is necessary to replace the battery when it has died. Thus, there is a problem that battery replacement becomes difficult when the device is installed in a pipeline buried underground, a pipeline provided in a high place or the like, although it is relatively easy to replace a battery when the device is installed in a pipeline for a multidwelling.

In this case, it is conceivable to interpose an electricity generator, e.g., a turbine of a turbine generator, in a pipeline, and store generated electricity to utilize it for wireless communication. However, such a turbine interposed in the pipeline becomes an obstruction to cause pressure reduction. Moreover, if the turbine is broken due to trapping of foreign substances or other factor, a function as a pipeline is likely to be impaired.

In the pipe network monitoring apparatus disclosed in the Patent Document 3, the inspection requires a manual handling work, so there is a problem that it is not easy to carry out the inspection for a pipeline buried underground, a pipeline provided in a high place or the like.

It is an object of the present invention to provide a leakage detector capable of exhibiting high sensitivity to vibration-sounds caused by water leakage from a synthetic resin pipe and thus setting an installation span longer to thereby make it possible to more efficiently perform a fluid leakage inspection for a synthetic resin pipe.

It is another object of the present invention to provide a pipe network monitoring apparatus capable of facilitating inspection of a pipeline having difficulty in manual inspection, such as a pipeline buried underground or a pipeline located in a high place, and free from a need for battery replacement.

Solution to the Technical Problem

The present invention provides a leakage detector for detecting vibration-sounds caused by fluid leakage from a pipeline. The leakage detector comprises a base, a piezoelectric element supported by the base and configured to convert vibration-sounds to an electric signal, and a weight member loaded against the piezoelectric element, wherein the piezoelectric element is made of a polymeric piezoelectric material.

Heretofore, piezoelectric ceramic such as barium titanate and lead zirconate titanate has been commonly used as a piezoelectric material for this type of detector. In the leakage detector of the present invention, the piezoelectric element is made of a polymeric piezoelectric material, so that an elastic constant of the piezoelectric element is lowered, and thus a resonant frequency of a system comprising the piezoelectric element and the weight member is also lowered. Therefore, sensitivity of the leakage detector to vibration-sounds caused by fluid leakage from a synthetic resin pipe can be enhanced, and an installation span of the leakage detectors can be set longer, so that it becomes possible to more efficiently perform a fluid leakage inspection for a synthetic resin pipe.

Here, discussed is the resonant frequency of the system comprising the piezoelectric element and the weight member.

When one end of a spring having a spring constant k (N/m) is fixed, and a weight member having a mass M (kg) is put on the other end of the spring, the resulting system has a resonant frequency fo expressed as follows:

$$fo=\sqrt{(k/M)}/2\pi.$$

The piezoelectric element can be deemed as a spring. Assuming that the elastic constant of the piezoelectric element is E, the spring constant k can be expressed as follows: k=E·A/t (where A represents a cross-sectional area (m$^2$) of the piezoelectric element, and t represents a thickness (m) of the piezoelectric element). Polyvinylidene fluoride (polymeric piezoelectric material) has an elastic constant E of 2×10$^9$ to 5×10$^9$ N/m$^2$). On the other hand, lead zirconate titanate (ceramic piezoelectric material) has an elastic constant of 2×10$^{10}$ to 10×10$^{10}$ (N/m$^2$), which is greater by one digit. For this reason, a vibration sensor using such a ceramics-based piezoelectric element tends to be designed to have a relatively high resonant frequency. In many cases, the resonant frequency is set to several kHz. Lowering of the resonant frequency requires a reduction in mass of the weight member. However, if the mass is reduced, a stress to be applied to the piezoelectric element becomes lower, so that it becomes impossible to obtain a large output. It is conceivable to use a rubber material to shift the resonant frequency to a lower value, as disclosed in the Patent Document 1. In this case, however, vibration is attenuated by the rubber material, so that it is unable to efficiently transmit vibration to the piezoelectric element. In the leakage detector of the present invention, the piezoelectric element is composed of a polymeric piezoelectric material to lower the elastic constant of the piezoelectric element itself so as to make the resonant frequency lower. According to need, an electrode made of silver, nickel copper or the like is attached to the polymeric piezoelectric material.

The piezoelectric element made of a polymeric piezoelectric material has a higher piezoelectric output constant as compared to the ceramics-based piezoelectric element. For example, lead zirconate titanate has a piezoelectric output constant $g_{33}$ of about 20×10$^{-3}$ (Vm/N), whereas polyvinylidene fluoride has a piezoelectric output constant $g_{33}$ of about 300×10$^{-3}$ (Vm/N). This shows that the polymeric piezoelectric material exhibits a higher output voltage V when a given force F is applied thereto.

$$V=F \cdot g_{33} \cdot t/A,$$

where V: output voltage, $g_{33}$: piezoelectric output constant, F: force applied to the piezoelectric material, t: thickness, and A: cross-sectional area.

The polymeric piezoelectric material in the present invention is not particularly limited, but may include a stretched polyvinylidene fluoride film or a stretched porous polypropylene film. In particular, polyvinylidene fluoride is preferred from the viewpoint of high durability. The piezoelectric element may be formed by laminating a plurality of piezoelectric material layer, to thereby further enhance the sensitivity, for example. A potential difference can be generated by loading a weight member on a piezoelectric film to cause the piezoelectric film to undergo deformation in a thickness direction thereof. A thickness of the film is not particularly limited, but may be a value equivalent to a thickness of a so-called "sheet".

Preferably, in the leakage detector of the present invention, only a portion of the piezoelectric element is supported by the base, and the weight member is loaded against a remaining portion of the piezoelectric element which is not supported by the base.

For example, a potential difference may be generated by causing the film to undergo bending deformation under the condition that one end or both ends of the film are supported. This is preferable from the view point that the spring constant can be decreased to allow the resonant frequency to be further lowered.

In the case where one end of the piezoelectric element is supported, the spring constant k is expressed as follows:

$$k=3EJ/L^3 (J=bh^3/12),$$

where E: elastic constant of the piezoelectric material, J: second moment of area, L: length, b: width, and h: height.

For example, in the leakage detector configured such that one end of the piezoelectric element is supported, a support device for supporting one end of the piezoelectric element is provided on the base, wherein one end of the piezoelectric element is supported by the support device, and the weight member is loaded against the other end of the piezoelectric element.

In the case where both ends of the piezoelectric element are supported, the spring constant k is expressed as follows:

$$k=192EJ/L^3 (J=bh^3/12)$$

For example, in the leakage detector configured to allow both ends of the piezoelectric element to be supported, two support devices for supporting both ends of the piezoelectric element are provided on the base, wherein both ends of the piezoelectric element are supported, respectively, by the two support devices, and the weight member is loaded against a central portion of the piezoelectric element.

In the leakage detector configured such that one end or both ends of the piezoelectric element are supported, the resonant frequency can be set to a desired value by using the above calculation formula for the spring constant and the above calculation formula for the resonant frequency.

Preferably, in the leakage detector of the present invention, the resonant frequency of a system comprising the piezoelectric element and the weight member is set in the range of 10 Hz to 1000 Hz. When the leakage detector is configured such that only a portion of the piezoelectric element is supported by the base, and the weight member is loaded against a remaining portion of the piezoelectric element which is not supported by the base, it becomes easier to set the resonant frequency to 1000 Hz or less. This setting allows the leakage detector of the present invention to become suitable for the aforementioned fluid leakage inspection of a synthetic resin pipe.

Preferably, in the leakage detector of the present invention, the piezoelectric element is laminated on at least one of upper or lower surfaces of a reinforcement layer.

In the leakage detector according to this embodiment, a position of a layer of the piezoelectric element (piezoelectric element layer) in the resulting laminate is deviated from a neutral axis of the laminate, so that it becomes possible to enhance the sensitivity. Therefore, the sensitivity to vibration-sounds caused by fluid leakage from a synthetic resin pipe can be enhanced, and the installation span can be set longer, so that it becomes possible to enhance suitability for the fluid leakage inspection of a synthetic resin pipe.

The leakage detector according to this embodiment may be configured such that only a portion of the laminate is supported by the base, and the weight member is loaded against a remaining portion of the laminate which is not supported by the base. In this case, for example, one end or both ends of a laminate prepared by laminating a film-shaped piezoelectric element and a sheet-shaped reinforcement layer may be supported, and a weight member may be loaded in such a manner as to cause the piezoelectric element layer to undergo a bending deformation (elastic deformation) to thereby generate a current or potential difference. This makes it possible to decrease the spring constant of the piezoelectric element layer and thus lower the resonant frequency.

When a tensile stress or compressive stress is applied to a film-shaped piezoelectric element in an in-plane direction thereof, a potential difference is generated in a thickness direction thereof. In the film-shaped piezoelectric element, a direction along which the potential difference is generated varies between when a tensile stress is applied and when a compressive stress is applied after release of the tensile stress. That is, vibration-sounds are converted to AC electricity. Upon application of a bending stress to the laminate, a tensile stress is applied to one side of the laminate with respect to the neutral axis, and a compressive stress is applied to the other side of the laminate with respect to the neutral axis. The neutral axis means a zero-stress position, and the tensile stress or compressive stress becomes larger along with an increase in distance from the neutral axis.

When the laminate undergoes a bending deformation, a large stress is generated in the piezoelectric element, and a large electric signal can be obtained from the piezoelectric element accordingly.

In this case, if the neutral axis is located within the thickness of the piezoelectric element, the piezoelectric element is internally divided into a region receiving a tensile stress and a region receiving a compressive stress, so that cancelling-out in terms of a current or potential difference occurs, causing rapid lowering in signal intensity. In the leakage detector configured such that the piezoelectric element layer is laminated on at least one of upper or lower surfaces of the reinforcement layer, the piezoelectric element is located at a position away from the neutral axis of the laminate, so that it becomes possible to enhance an electric signal output (sensitivity).

For example, in the case where the piezoelectric element is formed using a stretched polyvinylidene fluoride film, with a view to enhancing the sensitivity, it is preferable that a thickness of the stretched polyvinylidene fluoride film is set to about 100 μm, and the piezoelectric element is formed in a multi-layered structure comprising a plurality of the film-shaped piezoelectric elements, each having a thin film electrode on its upper and lower surfaces, respectively. The piezoelectric element layer formed in a multi-layered structure makes it possible to increase an area of the film-shaped piezoelectric element receiving a tensile stress or a compressive stress to obtain a higher output.

When forming such a multi-layered structure using a film-shaped piezoelectric element, a plurality of film-shaped piezoelectric elements each having a relatively small size (having a width and length for one layer) may be laminated one after another, while interposing an insulating layer therebetween, so as to extract an electric signal from each layer. Alternatively, a film-shaped piezoelectric element formed in a relatively elongated size (having a width for one layer and a length for a plurality of layers) and provided with a thin-film electrode on each of upper and lower surfaces thereof may be accordion-folded to form the piezoelectric element layer.

In the piezoelectric element layer obtained by accordion-folding the film-shaped piezoelectric element with the thin-film electrodes, folded thin-film electrode sections do not undergo short-circuiting, so that it becomes possible to eliminate a need for an insulating layer and a need to electrically connect respective folded thin-film electrode sections, to thereby readily obtain the multi-layered structure.

In the case where the piezoelectric element layer is laminated on each of the upper and lower surfaces of the reinforcement layer, one of the thin-film electrodes of the upper piezoelectric element layer is connected to a corresponding one of the thin-film electrodes of the lower piezoelectric element layer so as to avoid cancelling-out of electric signals, and an electric signal is extracted from each of the other thin-film electrode of the upper piezoelectric element layer and the other corresponding thin-film electrode of the lower piezoelectric element layer.

In the case where the piezoelectric element layer is laminated on each of the upper and lower surfaces of the reinforcement layer, as regards one of the thin-film electrodes and the other thin-film electrode of each of two piezoelectric element layers before the lamination, any one of them may face upwardly or downwardly, after the lamination. However, the thin-film electrodes of the laminated piezoelectric element layers are connected in such a manner as to avoid cancelling-out of electric signals. For example, assuming that each of an uppermost one of the thin-film electrodes of the upper piezoelectric element layer and a lowermost one of the thin-film electrodes of the lower piezoelectric element layer is defined as a first thin-film electrode, and each of a lowermost one of the thin-film electrodes of the upper piezoelectric element layer and an uppermost one of the thin-film electrodes of the lower piezoelectric element layer is defined as a second thin-film electrode, the second thin-film electrodes may be connected together by a coupling wire (electric wire for coupling), and the first thin-film electrodes may be connected together by a lead wire (electric wire for signal extraction).

When the piezoelectric element layers are disposed, respectively, on upper and lower sides with respect to the neutral axis, directions of stresses generated in the upper and lower piezoelectric element layers become different from each other. Even in such a situation, a large electric signal can be obtained by connecting the thin-film electrodes in such a manner as to avoid cancelling-out of electric signals.

Preferably, the reinforcement layer has a bending elastic modulus greater than that of the piezoelectric element layer.

In a laminate obtained by laminating a plurality of type of materials, a position of a neutral axis thereof is offset toward a material having a higher elastic modulus. Thus, in the case where the piezoelectric element layer and the reinforcement layer are laminated to form a laminate having a given thickness, a thickness ratio of the piezoelectric element layer can be increased as the reinforcement layer has a higher elastic modulus.

The leakage detector may be configured such that the thickness of the reinforcement layer is set to be greater than the thickness of the piezoelectric element layer, and the bending elastic modulus of the reinforcement layer is set to be greater than the bending elastic modulus of the piezoelectric element layer. This makes it possible to easily prevent the neutral axis during bending from lying inside the piezoelectric element layer.

If a material for the piezoelectric element is a polymeric material, the elastic modulus can be set to a relatively low value, and it becomes easier to offset the neutral axis toward the reinforcement layer. Further, in case where a laminate is formed in an accordion-folded manner, a polymeric material having flexibility is free from breakage during the accordion-folding. In the case where the material for the piezoelectric element layer is a polymeric material, it is preferable that the reinforcement layer is also made of a polymeric material. For example, a desired laminate can be obtained by employing PET (polyethylene terephthalate) as a material for the reinforcement layer, and forming PET to have a thickness greater than that of the piezoelectric element layer.

Preferably, the leakage detector of the present invention is configured to allow a distance between a support point of the piezoelectric element supported by a support device and a load point of the weight member to be variably changed in a mechanical manner to thereby allow a resonant frequency to be variably changed.

Specifically, the leakage detector according to this embodiment may comprise a piezoelectric element configured to convert vibration-sounds to an electric signal, a support device supporting one end of the piezoelectric element, and a weight member applying a load to the other end of the piezoelectric element. Thus, the spring constant can be decreased to allow the resonant frequency to be lowered. Therefore, the sensitivity to vibration-sounds caused by fluid leakage from a synthetic resin pipe can be enhanced, and the installation span can be set longer, so that it becomes possible to more efficiently perform a fluid leakage inspection for a synthetic resin pipe.

In addition, the leakage detector is configured to allow a distance between a support point of the piezoelectric element supported by the support device and a load point of the weight member to be variably changed in a mechanical manner, so that the resonant frequency can be freely controlled. Therefore, it becomes possible to cope with a plurality of different pipe members by using the same leakage detector and simply changing the distance between the support point supported by the support device and the load point of the weight member.

In a leakage detection method using the leakage detector of the present invention configured to variably change the resonant frequency, leakage detection can be performed with a high degree of accuracy by variably changing the resonant frequency of the leakage detector depending on a material and a bore diameter of a pipe member without replacing the leakage detector to other type. Therefore, it becomes possible to simplify a procedure for the detection, as compared to a leakage detection method configured to replace a leakage detector to other type depending on a material and a bore diameter of a pipe member.

The leakage detector according to this embodiment may be configured such that one end of the piezoelectric element is supported by the base, and the weight member is loaded against the other end (a remaining portion which is not supported by the base), for example, in the following manner: one end of a film-shaped (or sheet-shaped) piezoelectric element is supported, and a weight member is loaded in such a manner as to cause the piezoelectric element to undergo a bending deformation to thereby generate a potential difference. This makes it possible to decrease the spring constant and thus lower the resonant frequency. Therefore, the sensitivity to vibration-sounds caused by fluid leakage from a synthetic resin pipe can be enhanced, and the installation span can be set longer, so that it becomes possible to more efficiently perform a fluid leakage inspection for a synthetic resin pipe.

A target pipe member to be subjected to detection of fluid leakage includes various types different in terms of a material such as metal or synthetic resin, and a bore diameter, and a resonant frequency thereof varies according to the differences. The leakage detector according to the present invention is capable of changing the resonant frequency, so that it becomes possible to detect fluid leakage in various pipe members by changing the resonant frequency of the leakage detector using the same leakage detector.

As mentioned above, the resonant frequency fo of the system comprising the piezoelectric element and the weight member is expressed as follows: $fo=\sqrt{(k/M)}/2\pi$, and, in the case where one end of the piezoelectric element is supported, the spring constant k is expressed as follows:

$$k=3EJ/L3(J=bh3/12).$$

In this formula, L represents a length of a one-end-supported (cantilevered) beam, and the distance between the support point of the piezoelectric element supported by the support device and the load point of the weight member is equivalent thereto. That is, the resonant frequency can be variably changed by changing the distance between the support point and the load point.

The resonant frequency fo becomes lower along with an increase in the beam length L, and the resonant frequency fo becomes higher along with a decrease in the beam length L. The above formulas show that fo is inversely proportional to a 3/2 power of L.

Leakage vibration caused by leakage from a pipe varies in terms of a peak frequency, depending on a material and a bore diameter of a pipe. The leakage detector according to the present invention is capable of mechanically changing the beam length in conformity to a material and a bore diameter of a pipe to thereby freely control the resonant frequency.

The configuration for variably changing the support point of the piezoelectric element and the load point of the weight member in a mechanical manner is not particularly limited. For example, the support device may comprise a support device fixed to the base, and a slider configured to be displaced above and along the base while clamping a portion of the piezoelectric element located on the side of one end, from thereabove and therebelow, to thereby change a length of a supported portion of the piezoelectric element.

The leakage detector according to this embodiment is capable of changing the distance between the support point and the load point, while facilitating an operation of changing the distance between the support point and the load point.

It is preferable that the resonant frequency of the leakage detector is set to 150 Hz or less when the distance between the support point and the load point is maximized, and set to 400 Hz or more when the distance between the support point and the load point is minimized.

A leakage detector having a resonant frequency of 150 Hz or less is suitably used in a situation where a target pipe member to be subjected to leakage detection is made of a synthetic resin, and formed to have a relatively large bore diameter. On the other hand, a leakage detector having a resonant frequency of 400 Hz or more is suitably used in a situation where the target pipe member is made of a metal, and formed to have a relatively small bore diameter. The leakage detector according to this embodiment is configured to be selectively set to 150 Hz or less and 400 Hz or more. Thus, for example, even in a situation where a plurality of different pipe members are used in a target tap water line to be inspected, it becomes possible to cope with such a situation, only by changing the distance between the support point of the piezoelectric element supported by the support device and the load point of the weight member, using the same leakage detector.

The present invention also provides a leakage detection method which comprises installing any one of the above leakage detectors in a vicinity of a pipe member, and detecting vibration caused by fluid leakage from the pipe member, to thereby determine the presence or absence of the fluid leakage.

In the leakage detection method of the present invention, depending on whether the target pipe member is made of a synthetic resin or metal, it is preferable that the resonant frequency of the leakage detector is set to a relatively low value in a variable range, for the pipe member made of a synthetic resin, and set to a relatively high value in the variable range, for the pipe member made of a metal. Further, depending on whether the target pipe member has a relatively large bore diameter or a relatively small bore diameter, it is preferable that the resonant frequency of the leakage detector is set to a relatively low value in the variable range, for the pipe member having a relatively large bore diameter, and set to a relatively high value in the variable range, for the pipe member having a relatively small bore diameter.

Thus, the leakage detector configured to variably change the resonant frequency can be used in the leakage detection performed with a high degree of accuracy by variably changing the resonant frequency of the leakage detector depending on a material and a bore diameter of a pipe member without replacing the leakage detector to other type. Therefore, it becomes possible to simplify a procedure for the detection, as compared to a leakage detection method configured to replace a leakage detector to other type depending on a material and a bore diameter of a pipe member.

The present invention further provides a pipe network monitoring apparatus which comprises: a plurality of piezoelectric elements each mounted, respectively, at a plurality of locations of a pipe network comprised of pipes and joints, and configured to convert a pressure fluctuation along with movement of a fluid through a pipeline to an electric charge signal; a plurality of communication devices each configured to transmit the electric charge signal obtained by a respective one of the leakage detectors; and a display device configured to receive and display information transmitted from the communication devices, at a remote location.

As each of the piezoelectric elements, it is possible to use a type made of a ceramic material such as lead zirconate titanate or barium titanate, or a type made of a resin material such as polyvinylidene fluoride.

Each of the pipes and joints receives a force from a fluid flowing through the pipe network, and each of the piezoelectric elements provided on each of the pipes or joints is deformed by minute vibration and strain to generate a voltage and electric charges. The generated voltage may be directly transmitted as a signal, or electric charges may be stored in an electricity storage element once and used as an electricity source for the communication device configured to transmit the signal. The signal transmission may be performed in a wired manner or may be performed in a wireless manner. However, the wireless transmission is preferred, because it is free from a risk of disconnection due to disaster such as earthquake. The signal transmission may be continuously performed or may be intermittently performed. Alternatively, the signal transmission may be stopped in a normal state and performed only when a certain parameter departs from a given specified range.

Address information is assigned to each of the piezoelectric elements, and transmitted together with information about an electric charge signal. This makes it possible to identify a location of each of the piezoelectric elements to facilitate management of information about electric charge signals from the piezoelectric elements.

In the normal state, the entire electric charges may be stored. Alternatively, a part of electric charges are directly used as a signal, and the remaining electric charges may be stored. Further, the piezoelectric element may be composed of two different piezoelectric elements: one piezoelectric element for acquiring information about an electric signal; and another piezoelectric element for storing electric charges in the electricity storage element. As the electricity storage element, a capacitor such as an electric double layer capacitor may be used, but not limited thereto.

In some cases, the piezoelectric element is connected to a control circuit which is provided with a determination device configured to determine whether or not an electric charge signal obtained by the piezoelectric element is normal.

Generally, the above piezoelectric element has an extremely large output impedance. Thus, in order to suppress an influence of noise to accurately extract electric charges as a signal, it is desirable to amplify electric charges through a charge amplifier and then convert the amplified electric charges to a voltage output.

A normal range for determining abnormality from the signals may be set based on upper and lower limits of the voltage output, a frequency band of vibration, or the like. The determination as to whether or not a given parameter falls within the normal range may be performed on the receiving side, may be performed by the control circuit incorporated in the transmitting side. It is preferable to provide the control circuit on the transmitting side to determine the abnormality, because it becomes possible to form information about the abnormality together with the aforementioned address information while cutting unnecessary information, so as to avoid redundant wireless communication.

As the display device, a personal computer may be used, but not limited thereto. Preferably, during detection of the abnormality, a warning is issued using sound or light. Numerical information or the like is not necessarily displayed, but only a warning during detection of the abnormality may be displayed.

Preferably, in the leakage detector of the present invention, the piezoelectric element comprises a stretched polyvinylidene fluoride film provided on each of the joints.

The stretched polyvinylidene fluoride film is excellent as a material for the piezoelectric element, from the viewpoint that it is excellent in shock resistance because of its flexibility, and chemically stable.

A location where the piezoelectric element is mounted may be a portion of the pipe network, such as the pipes or joints. It is preferable to incorporate it in each of the joints which are installed at constant intervals and free from machining such as cutting during construction, but not particularly limited thereto. The joints are also preferable from the viewpoint of easiness to detect abnormality of the pipe network because a stress is more likely to be applied to the joints when a large external force due to earthquake or the like is applied to the pipe network.

Examples of a material for each pipe and joint constituting the pipe network include, but are not particularly limited to, stainless steel, cast iron, concrete, fiber-reinforced plastic, polyvinyl chloride, polyethylene, cross-linked polyethylene, polypropylene, polybutene, and fluororesin.

Examples of a type of fluid flowing through the pipe network include, but are not particularly limited to, water, gas, medicinal solution, oil, and slurry.

Effect of the Invention

In the leakage detector of the present invention, the piezoelectric element is made of a polymeric piezoelectric material, so that the elastic constant of the piezoelectric element is lowered, and thus the resonant frequency of the system comprising the piezoelectric element and the weight member is also lowered. Therefore, the sensitivity to vibration-sounds caused by fluid leakage from a synthetic resin pipe can be enhanced, and the installation span can be set longer, so that it becomes possible to more efficiently perform a fluid leakage inspection for a synthetic resin pipe.

In the pipe network monitoring apparatus of the present invention, an electric charge signal obtained from the piezoelectric element is displayed on the display device located at a remote location, and whether or not the pipe network is normal can be monitored based on information about the electric charge signal which varies depending on whether the pipe network is in a normal state or in an abnormal state.

BRIEF DESCRIPTION OF THE DRAWINGS

FIG. 5 is a chart illustrating an example of an output state of the pipe network monitoring apparatus in a normal state.

FIG. 6 is a chart illustrating an example of an output state of the pipe network monitoring apparatus in an abnormal state.

FIG. 18 is a schematic diagram illustrating an operation of the leakage detector according to the eighth embodiment.

FIG. 19 is a schematic diagram illustrating a leakage detector according to a ninth embodiment of the present invention.

DESCRIPTION OF REFERENCE SIGNS

1: pipe network monitoring apparatus, 2: pipe network, 3: synthetic resin pipe, 4, 5: joint, 6: leakage detector, 7: wireless communication device, 8: analyzing device, 9: piezoelectric element, 11: capacitor (electricity storage element), 13: control circuit, 21, 34, 38, 41: base, 24, 28, 31, 33, 36, 37, 40: weight member, 27, 29, 30, 32: support post (support device), 35, 39: support device, 41d: sidewall (support device), 51: laminate, 52: reinforcement layer, 61: support device, 63: slider

DESCRIPTION OF EMBODIMENTS

With reference to the drawings, various embodiments of the present invention will now be described.

Figure 1:
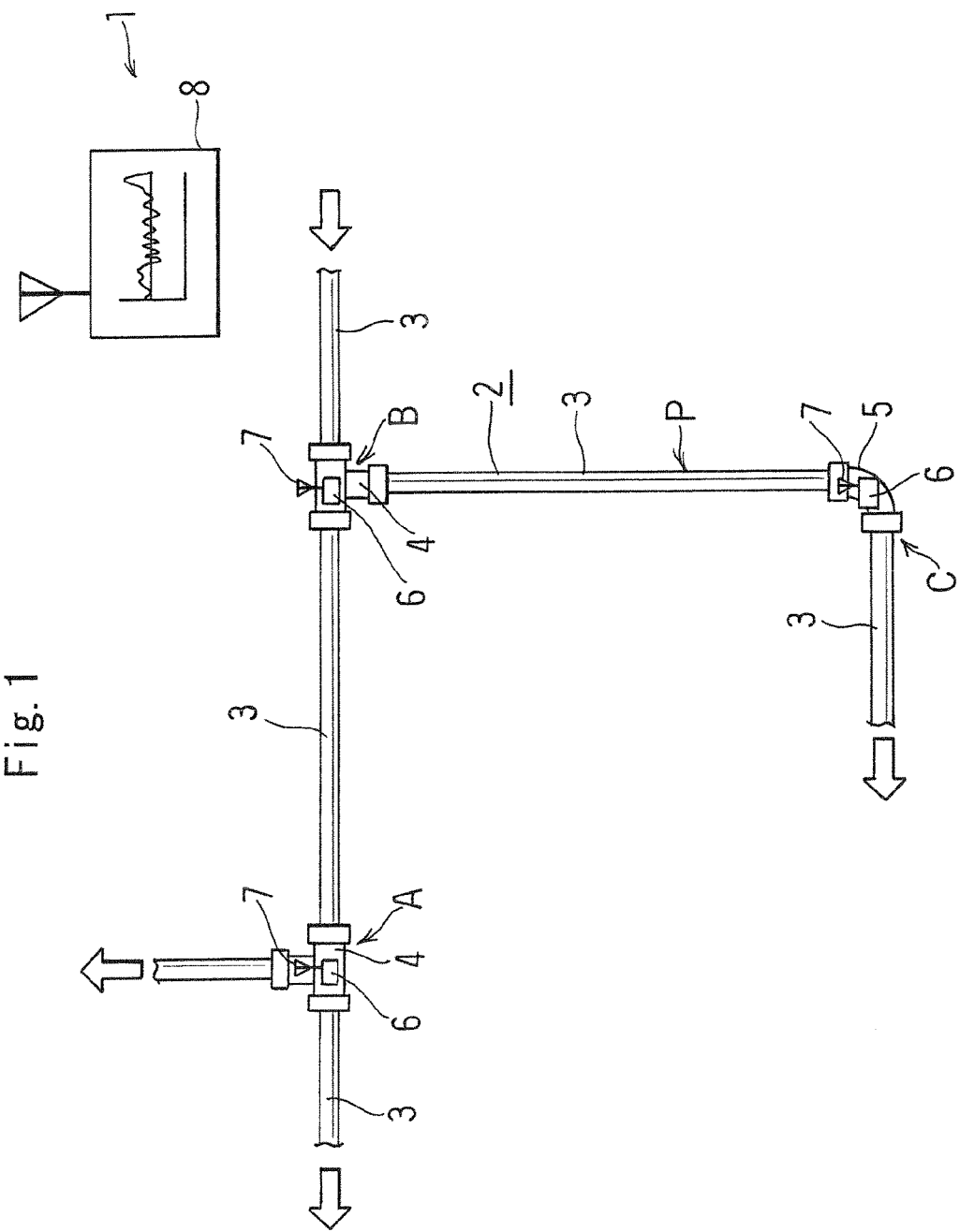
FIG. 1 is a schematic diagram illustrating a pipe network monitoring apparatus according to one embodiment of the present invention.
Figure 2:
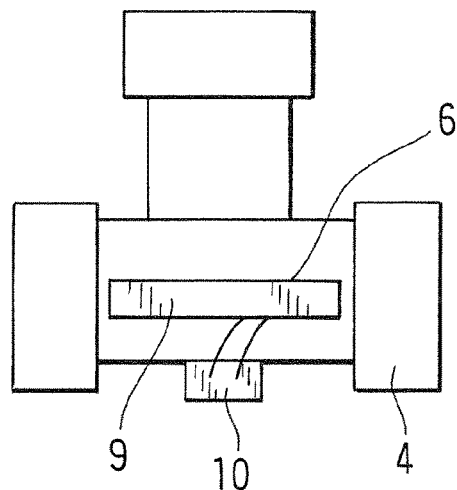
FIG. 2 is a diagram illustrating one example of a leakage detector mounted on a joint.

FIG. 1 illustrates a pipe network monitoring apparatus according to one embodiment of the present invention.

The pipe network monitoring apparatus 1 comprises: a pipe network (in the illustrated embodiment, tap water pipeline network) 2 comprising a plurality of pipes 3 and a plurality of joints 4, 5; a plurality of leakage detectors 6 mounted, respectively, on the joints 4, 5; a plurality of wireless communication devices 7 connected, respectively, to the leakage detectors 6; and an analyzing device 8 configured to receive and analyze information sent from the wireless communication devices 7.

Each of the leakage detectors 6 comprises a piezoelectric element 9, and a control board 10 electrically connected to the piezoelectric element 9. The piezoelectric element 9 is formed using a stretched polyvinylidene fluoride film (stretched PVDF film).

When a fluid flows through the pipe network 2, minute vibration and strain occur in each of the pipes 3 and the joints 4, 5 due to a force applied from the fluid thereto. Accordingly, a pressure to be applied to the piezoelectric element 9 attached onto each of the joints 4, 5 fluctuates, and this pressure fluctuation is converted to an electric charge signal by the piezoelectric element 9.

Figure 3:
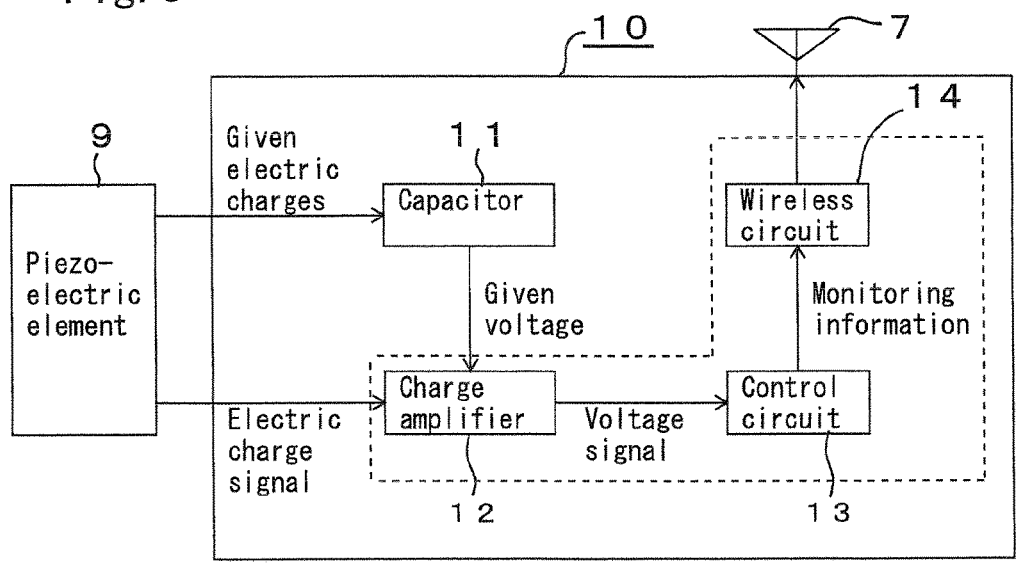
FIG. 3 is a block diagram illustrating a leakage detector used in the pipe network monitoring apparatus according to the embodiment of present invention.

As illustrated in FIG. 3, the control board 10 is provided with a capacitor (electricity storage element) 11 for an electricity source, a charge amplifier 12, a control circuit 13 and a wireless circuit 14.

A part of electric charges obtained by the piezoelectric element 9 are sent to the capacitor 11, and the remainder is sent to the charge amplifier 12.

The capacitor 11 is configured to store therein electric charges, and supply a given voltage to each section (the charge amplifier 12, the control circuit 13, the wireless circuit 14, etc.) of the leakage detector 6.

Alternatively, an external electricity source may be used, wherein the capacitor 11 is omitted. In the case where a battery is used, there may be a need for battery replacement. However, electric charges obtained by the piezoelectric element 9 can be used as an electricity source to eliminate the need for battery replacement.

An electric charge signal obtained by the piezoelectric element 9 is amplified through the charge amplifier 12. Although the piezoelectric element 9 is more likely to receive an influence of noise because of its extremely large output impedance, the charge amplifier 12 can be used to amplify an electric charge signal and accurately extract the amplified electric charge signal in the form of a voltage signal.

The voltage signal output from the charge amplifier 12 is subjected to processing in the control circuit 13, and then transmitted as monitoring information to the analyzing device 8 via the wireless circuit 14. Each of the leakage detectors 6 is assigned with address information, so that a pressure fluctuation at a given location in the pipe network 2 can be monitored by the analyzing device 8 such as a personal computer.

The pressure fluctuation includes one pattern occurring due to a normal fluid flow, and another pattern occurring in an abnormal state. Thus, the control circuit 13 may be provided with an appropriate determination device to allow monitoring information (abnormality information) to be output only when abnormality occurs.

Electric charge signals at respective positions indicated by A, B and C in FIG. 1 in a normal state have waveforms, for example, as illustrated in FIG. 5. Supposing a situation where water leakage occurs due to breakage of the pipe 3 at a position indicated by P in FIG. 1, the electric charge signals have waveforms, for example, as illustrated in FIG. 6. That is, voltage signals of the leakage detectors 6 located in the vicinity of the breakage location (at the position B and the position C) largely oscillate beyond a normal range due to a flow of the fluid, wherein a voltage signal of the leakage detector 6 located at a position closest to the breakage location (the position C) most largely fluctuate (in terms of not only voltage amplitude but also oscillation frequency).

Thus, abnormality can be detected by: setting reference values of upper and lower limits of the voltage output and/or an oscillation frequency band, in regard to the voltage signal output from the charge amplifier 12; comparing a current voltage signal with the reference values; and determining as abnormality a situation where the voltage signal becomes greater than the reference values. In this way, excessive vibration due to water leakage can be detected, and a water leakage location can be identified.

The analyzing device 8 is provided in a central processing room. Thus, even in a situation where the pipe network 2 comprises a pipeline having difficulty in manual inspection, such as a pipeline buried underground or a pipeline located in a high place, abnormality thereof can be easily detected.

Figure 4:
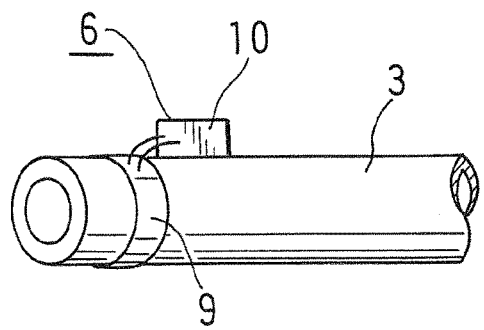
FIG. 4 is a diagram illustrating one example of a leakage detector mounted on a pipe.

The leakage detector 6 may be mounted on each of the pipes 3, instead of the joints 4, 5. In this case, as illustrated in FIG. 4, the piezoelectric element 9 composed of a stretched polyvinylidene fluoride film may be attached around the pipe 3, and connected to the control board 10.

In the above embodiment, an appropriate determination device is provided in the control circuit 13 to output monitoring information (abnormality information) only when the abnormality occurs. Alternatively, the determination device may be provided in the analyzing device 8, wherein the leakage detector 6 may be configured to transmit a voltage signal output directly from the charge amplifier 12 to the analyzing device 8.

Preferred embodiments of the leakage detector 6 will be described below.

Figure 7:
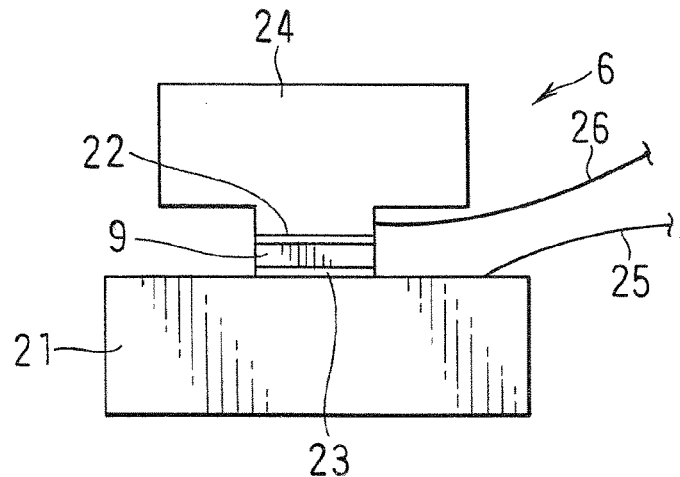
FIG. 7 is a schematic diagram illustrating a leakage detector according to a first embodiment of the present invention.

As illustrated in FIG. 7, a leakage detector 6 according to a first embodiment of the present invention comprises: a base 21 made of iron; a piezoelectric element 9 located above the base 21; a pair of upper and lower thin-film electrodes 22, 23 formed, respectively, on upper and lower surfaces of the piezoelectric element 9 by coating each of the surfaces with a silver paste; and a weight member 24 loaded on the upper thin-film electrode 22. Two lead wires 25, 26 are attached, respectively, to the base 21 and the weight member 24. An oscilloscope, a data logger and others constituting the analyzing device 8 are connected to the lead wires 25, 26. Thus, a potential difference between the base 21 and the weight member 24 is measured, and recorded in the analyzing device 8.

The piezoelectric element 9 is formed using a stretched polyvinylidene fluoride film (stretched PVDF film) which is a polymeric piezoelectric material. A resonant frequency ($fo=\sqrt{(k/M)}/2\pi$, where k represents a spring constant of the piezoelectric element, and M represents a mass of the weight member) of a system comprising the piezoelectric element 9 and the weight member 24 is set in the range of 10 Hz to 1000 Hz.

In the event of water leakage in a pipeline 2, vibration-sounds are generated in each of a plurality of synthetic pipes 3 and a plurality of synthetic resin joints 4, 5. Accordingly, a pressure to be applied to the piezoelectric element 9 of the leakage detectors 6 attached onto each of the synthetic resin joints 4, 5 fluctuates, and this pressure fluctuation is converted to an electric charge signal by the piezoelectric element 9.

Figure 24:
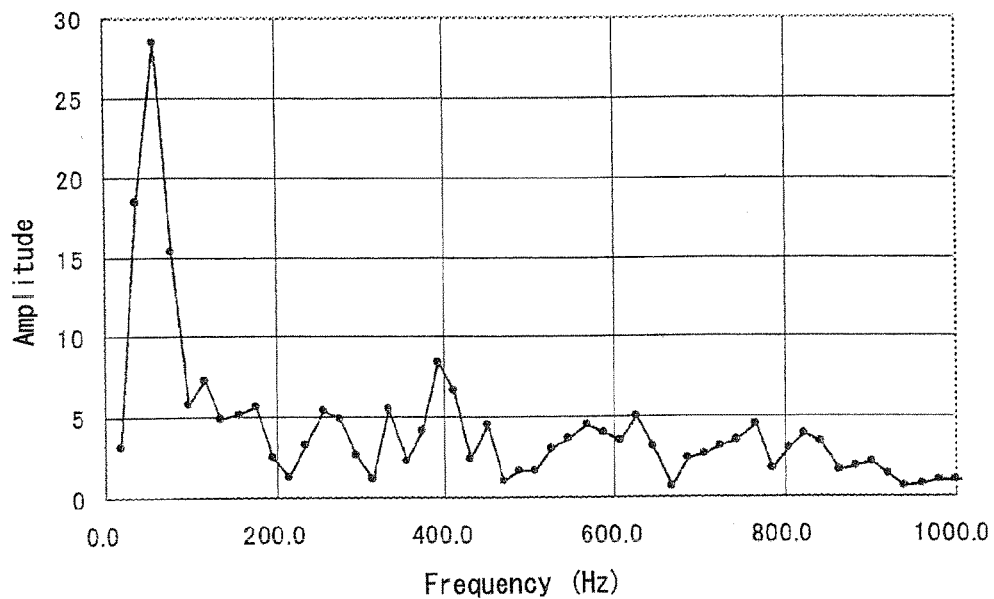
FIG. 24 is a graph illustrating one example of a water leakage sound obtained using a leakage detector according to the present invention.

By way of experiment, the base 21 was fixed onto a pipeline 2 made of polyvinyl chloride and formed to have a bore diameter of 75 mm, and a synthetic pipe 3 made of polyvinyl chloride at a point away from the fixed position by 10 m was beaten with a hammer by a given force. As seen in FIG. 24 illustrating a frequency spectrum of a waveform (water leakage sound) at the time, a large signal was recorded in a frequency band on a frequency side lower than 1000 Hz.

Figure 25:
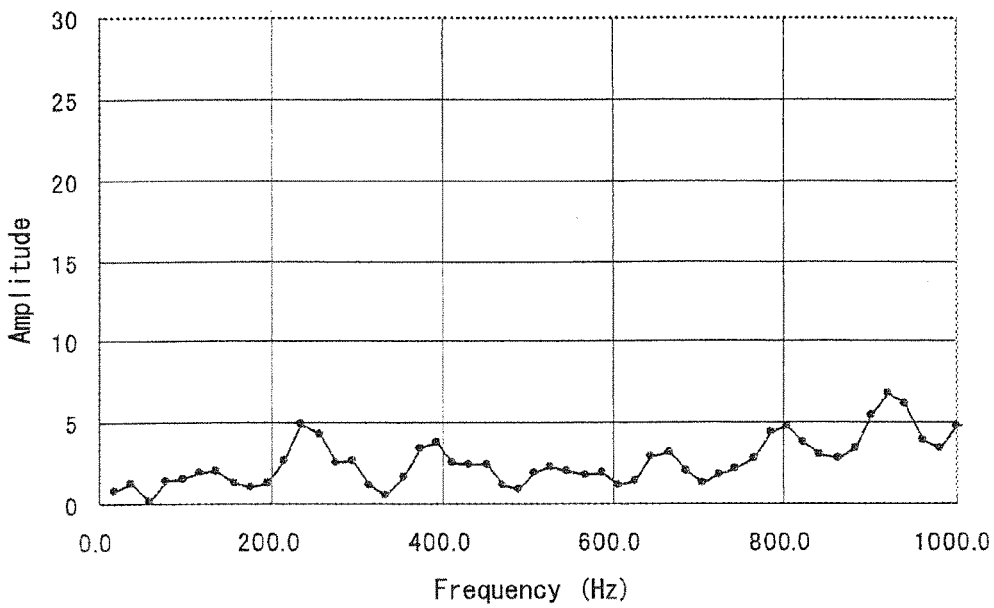
FIG. 25 is a graph illustrating one example of a water leakage sound obtained using a conventional leakage detector.

For comparison, FIG. 25 illustrates a frequency spectrum of a waveform (water leakage sound) obtained when a material for the piezoelectric element is lead zirconate titanate. FIG. 25 shows that a signal in a low frequency region corresponding to distinctive vibration of the synthetic resin pipe 3 which could be detected in FIG. 24 is almost not picked up.

That is, the leakage detector 6 illustrated in FIG. 7 is enhanced in sensitivity to vibration-sounds caused by water leakage from a synthetic resin pipe 3 made of polyvinyl chloride or the like, which has heretofore been hardly realizable. Thus, an installation span of the leakage detectors 6 can be set longer, so that it becomes possible to efficiently perform a fluid leakage inspection for a synthetic resin pipe 3.

In FIG. 7, the piezoelectric element 9 is supported by the base 21 through the entire surface thereof. However, a support morphology is not limited thereto, but those in aftermentioned embodiments may be employed.

Figure 8:
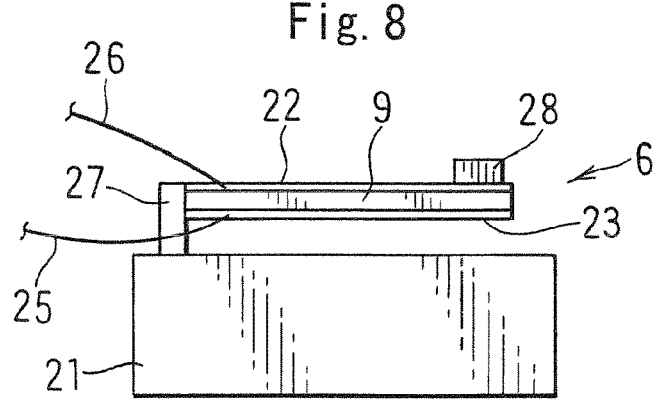
FIG. 8 is a schematic diagram illustrating a leakage detector according to a second embodiment of the present invention.

As illustrated in FIG. 8, a leakage detector 6 according to a second embodiment of the present invention comprises: a base 21 made of iron; a piezoelectric element 9 located above the base 21; a support post (support device) 27 having a lower end fixed to the base 21 and an upper end supporting the piezoelectric element 9; a pair of upper and lower thin-film electrodes 22, 23 formed, respectively, on upper and lower surfaces of the piezoelectric element 9 by coating each of the surfaces with a silver paste; and a weight member 28 loaded on the upper thin-film electrode 22. The support post 27 and each of the upper and lower thin-film electrodes 22, 23 are electrically isolated from each other, and two lead wires 25, 26 are attached, respectively, to the lower and upper thin-film electrodes 23, 22. The analyzing device 8 is connected to the lead wires 25, 26. Thus, a potential difference between the upper thin-film electrode 22 and the lower thin-film electrode 23 is measured, and recorded in the analyzing device 8.

In the second embodiment, the piezoelectric element 9 is one-end-supported (cantilevered) by the support post 27, wherein one end of the piezoelectric element 9 is supported by the upper end of the support post 27, and the weight member 28 is loaded on the other end of the piezoelectric element 9.

The piezoelectric element 9 is formed using a stretched polyvinylidene fluoride film (stretched PVDF film) which is a polymeric piezoelectric material. One end of the piezoelectric element 9 is supported. Thus, a spring constant k thereof is expressed as follows:

$$k=3EJ/L3(J=bh3/12),$$

where E: elastic constant of the piezoelectric material, J: second moment of area, L: length (dimension in a right-left direction in FIG. 8), b: width (dimension in a front-back direction of the drawing sheet in FIG. 8), and h: height (dimension in an up-down direction in FIG. 7). A resonant frequency (fo=√(k/M)/2π) of a system comprising the piezoelectric element 9 and the weight member 28 is set in the range of 10 Hz to 1000 Hz.

In the second embodiment, a signal in a low frequency region corresponding to distinctive vibration of a synthetic resin pipe 3 could be measured by measuring a potential difference from the lead wires 25, 26, in the same manner as that illustrated in FIG. 24.

Although the second embodiment has been described based on an example in which one piezoelectric element is fixed to one support device, it is not limited thereto. For example, a leakage detector having a plurality of one-end-supported (cantilevered) beams may be constructed by fixing a plurality of piezoelectric elements to one support device, and correspondingly providing a plurality of weight members thereon.

Figure 9:
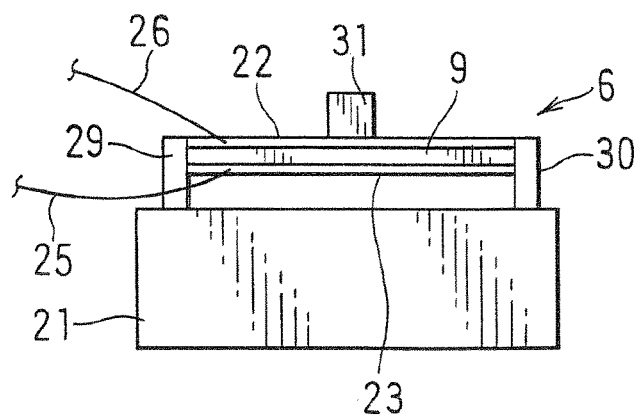
FIG. 9 is a schematic diagram illustrating a leakage detector according to a third embodiment of the present invention.

As illustrated in FIG. 9, a leakage detector 6 according to a third embodiment of the present invention comprises: a base 21 made of iron; a piezoelectric element 9 located above the base 21; a pair of support posts (support device) 29, 30 each having a lower end supported by the base 21 and an upper end supporting the piezoelectric element 9; a pair of upper and lower thin-film electrodes 22, 23 formed, respectively, on upper and lower surfaces of the piezoelectric element 9 by coating each of the surfaces with a silver paste; and a weight member 31 loaded on the upper thin-film electrode 22. Each of the support posts 29, 30 and each of the upper and lower thin-film electrodes 22, 23 are electrically isolated from each other, and two lead wires 25, 26 are attached, respectively, to the lower and upper thin-film electrodes 23, 22. The analyzing device 8 is connected to the lead wires 25, 26. Thus, a potential difference between the upper thin-film electrode 22 and the lower thin-film electrode 23 is measured, and recorded in the analyzing device 8.

In the third embodiment, the piezoelectric element 9 is both-end-supported by the support posts 29, 30, wherein both ends of the piezoelectric element 9 are supported, respectively, by upper ends of the support posts 29, 30, and the weight member 31 is loaded on a central portion of the piezoelectric element 9.

The piezoelectric element 9 is formed using a stretched polyvinylidene fluoride film (stretched PVDF film). Both ends of the piezoelectric element 9 are supported. Thus, a spring constant k thereof is expressed as follows:

$$k=192EJ/L3(J=bh3/12),$$

where E: elastic constant of the piezoelectric material, J: second moment of area, L: length (dimension in a right-left direction in FIG. 9), b: width (dimension in a front-back direction of the drawing sheet in FIG. 9), and h: height (dimension in an up-down direction in FIG. 9). A resonant frequency (fo=√(k/M)/2π) of a system comprising the piezoelectric element 9 and the weight member 31 is set in the range of 10 Hz to 1000 Hz.

In the third embodiment, a signal in a low frequency region corresponding to distinctive vibration of a synthetic resin pipe 3 could be measured by measuring a potential difference from the lead wires 25, 26, in the same manner as that illustrated in FIG. 24.

Figure 10:
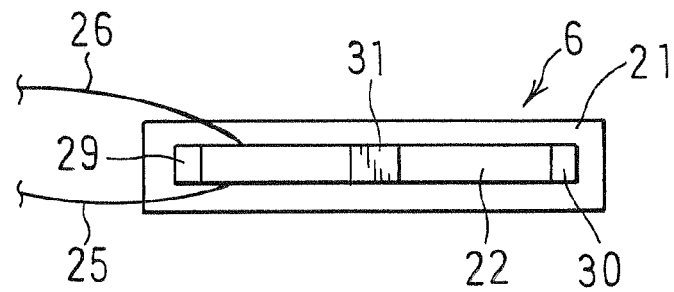
FIG. 10 is a top plan view of the leakage detector in FIG. 9.

A shape of each of the piezoelectric element 9 and the thin-film electrodes 22, 23 in the leakage detector 6 according to the third embodiment is not particularly limited, but may be a rectangular shape in which a length corresponding to a distance between the support posts 29, 30 is greater than a width perpendicular to a direction of the length, as illustrated in FIG. 10. In this case, an amount of bending deformation can be increased. In the case where it is attempted to reduce a resonant frequency of the leakage detector 6, it is possible to cope with the need by making the rectangular shape narrower and longer. Although FIG. 10 is a diagram corresponding to the third embodiment, it can also apply to a shape of the each of the piezoelectric element 9 and the thin-film electrodes 22, 23 in the leakage detector 6 according to the second embodiment illustrated in FIG. 8.

In the third embodiment illustrated in FIGS. 9 and 10, as regards a relationship between a support point of the rectangular-shaped piezoelectric element 9 and a load point of the weight member 31, both ends of the piezoelectric element 9 are supported (i.e., both-end-supported), and the weight member 31 is loaded on the central portion of the piezoelectric element 9. Alternatively, a central portion of the piezoelectric element 9 may be supported, and two weight members may be loaded, respectively, on both ends of the piezoelectric element 9. In this case, a support structure of the piezoelectric element is deemed to be a combination of two one-end-supported (cantilevered) structures. Thus, the spring constant k can be increased to the same degree as that in the second embodiment.

Further, in the third embodiment illustrated in FIGS. 9 and 10, both ends of the rectangular-shaped piezoelectric element 9 are supported. Alternatively, the piezoelectric element be formed in a square or circular shape, wherein a peripheral edge portion (not both ends) of the piezoelectric element 9 may be supported, and the weight member 33 may be loaded on a central portion of the piezoelectric element 9, to obtain the same effects. This configuration is illustrated in FIGS. 11 and 12 as a fourth embodiment of the present invention.

Figure 11:
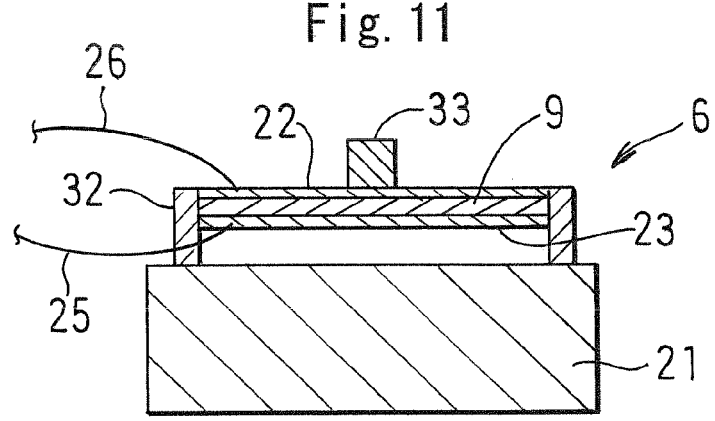
FIG. 11 is a schematic diagram illustrating a leakage detector according to a fourth embodiment of the present invention.
Figure 12:
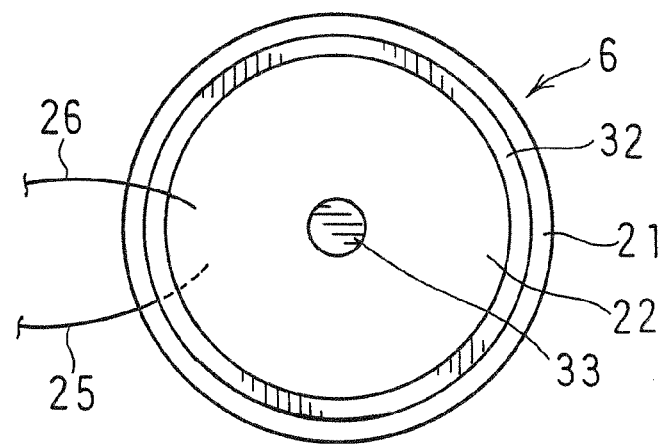
FIG. 12 is a top plan view of the leakage detector in FIG. 11.

In FIGS. 11 and 12, a leakage detector 6 according to a fourth embodiment of the present invention comprises: a base 21 made of iron; a circular-shaped piezoelectric element 9 located above the base 21; a circular tubular-shaped support post (support device) 32 having a lower end fixed to the base 21 and an upper end supporting the piezoelectric element 9; a pair of upper and lower thin-film electrodes 22, 23 formed, respectively, on upper and lower surfaces of the piezoelectric element 9 by coating each of the surfaces with a silver paste; and a weight member 33 loaded on the upper thin-film electrode 22. The support post 32 and each of the upper and lower thin-film electrodes 22, 23 are electrically isolated from each other, and two lead wires 25, 26 are attached, respectively, to the lower and upper thin-film electrodes 23, 22. The analyzing device 8 is connected to the lead wires 25, 26. Thus, a potential difference between the upper thin-film electrode 22 and the lower thin-film electrode 23 is measured, and recorded in the analyzing device 8.

In the fourth embodiment, the piezoelectric element 9 is supported by the support post 32 in a peripheral-edge support structure in which a (ring-shaped) peripheral edge portion of the piezoelectric element 9 are supported by an upper end of the support post 32. Further, the weight member 33 is loaded on a central portion of the circular-shaped piezoelectric element 9.

The piezoelectric element 9 is formed using a stretched polyvinylidene fluoride film (stretched PVDF film). The peripheral edge portion of the piezoelectric element 9 is supported, so that the piezoelectric element 9 has a relatively small compressive deformation and a relatively large bending deformation. Thus, the spring constant k can be increased to the same degree as that in a both-end-supported structure.

Although illustration is omitted, the positional relationship in which the peripheral edge portion of the piezoelectric element 9 is supported, and the weight member 33 is loaded on the central portion of the piezoelectric element 9, in the fourth embodiment, may be reversed such that the central portion of the piezoelectric element 9 is supported by a circular columnar-shaped support device, and a ring-shaped weight member is loaded on the peripheral edge portion of the piezoelectric element 9. When the central portion of the piezoelectric element 9 is supported by a circular columnar-shaped support device, and the weight member 33 is loaded on the peripheral edge portion of the piezoelectric element 9, the piezoelectric element 9 has a relatively small compressive deformation and a relatively large bending deformation. Thus, the spring constant k can be increased to the same degree as that in a both-end-supported structure.

Figure 14:
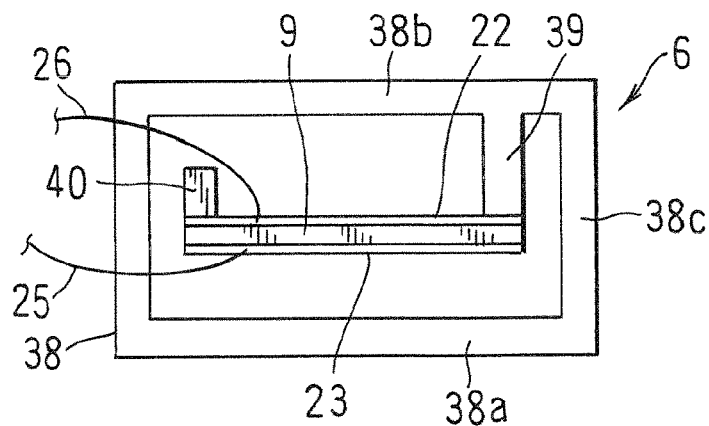
FIG. 14 is a schematic diagram illustrating a leakage detector according to a sixth embodiment of the present invention.
Figure 15:
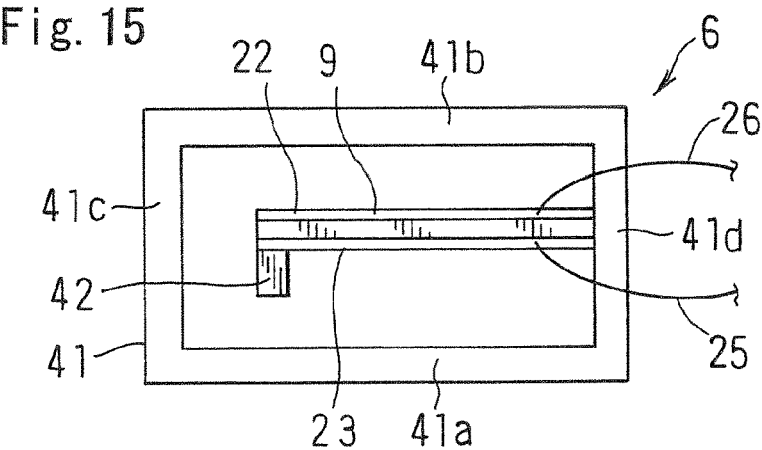
FIG. 15 is a schematic diagram illustrating a leakage detector according to a seventh embodiment of the present invention.

In each of the foregoing embodiments, the weight member 24, 28, 31, 33 is loaded on the upper surface of the piezoelectric element 9. Alternatively, the weight member may be fixed to the lower surface of the piezoelectric element 9 in a hanging manner to apply a load to the piezoelectric element. Further, in place of the configuration in which the piezoelectric element 9 is supported by the upper end of the support post 27, 29, 30, 32 as the support device, the piezoelectric element may be supported by the lower end of the support device in a hanging manner. This configuration is illustrated in FIGS. 13 to 15.

Figure 13:
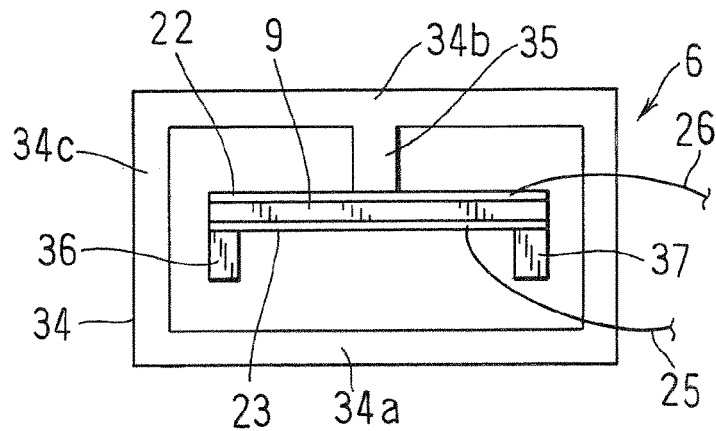
FIG. 13 is a schematic diagram illustrating a leakage detector according to a fifth embodiment of the present invention.

In a leakage detector 6 according to the fifth embodiment illustrated in FIG. 13, a base 34 is formed in a hollow rectangular parallelepiped shape having a bottom wall 34a, a top wall 34b and a side wall 34c, and a columnar-shaped support device 35 is provided in such a manner as to hang downwardly from the top wall 34b. A piezoelectric element 9 is formed in the rectangular shape illustrated in FIG. 10. A pair of upper and lower thin-film electrodes 22, 23 are formed, respectively, on upper and lower surfaces of the piezoelectric element 9 by coating each of the surfaces with a silver paste. An upper surface of a central portion of the piezoelectric element 9 is fixed to a lower end surface of the support device 35 through the upper thin-film electrode 22. Two rectangular parallelepiped-shaped weight members 36, 37 are used, and an upper surface of each of the weight members is bonded to a lower surface of a respective one of both ends of the lower thin-film electrode 23. The lower end of the support device 35 and the upper thin-film electrode 22 are electrically isolated from each other, and two lead wires 25, 26 are attached, respectively, to the lower and upper thin-film electrodes 23, 22. The analyzing device 8 is connected to the lead wires 25, 26. Thus, a potential difference between the pair of upper and lower thin-film electrodes 22, 23 is measured, and recorded in the analyzing device 8.

In this embodiment (fifth embodiment), the central portion of the piezoelectric element 9 is supported, and the weight members 36, 37 are loaded, respectively, against the opposite both ends of the piezoelectric element 9, so that the spring constant k can be increased, as with the second to fourth embodiments.

In FIG. 13, the shape of the piezoelectric element 9 may be changed to a circular shape or a square shape, and the shape of each of the weight members 36, 37 may be changed to a circular tubular shape or a square tubular shape (i.e., a configuration similar to that in the fourth embodiment illustrated in FIGS. 11 and 12).

FIG. 14 illustrates an example in which the fifth embodiment is modified to a one-end-supported (cantilevered) structure. In a leakage detector 6 according to the sixth embodiment illustrated in FIG. 14, a base 38 is formed in a hollow rectangular parallelepiped shape having a bottom wall 38a, a top wall 38b and a side wall 38c, and a columnar-shaped support device 39 is provided in such a manner as to hang downwardly from a vicinity of one end of the top wall 38b. A piezoelectric element 9 is formed in the rectangular shape illustrated in FIG. 10. A pair of upper and lower thin-film electrodes 22, 23 are formed, respectively, on upper and lower surfaces of the piezoelectric element 9 by coating each of the surfaces with a silver paste. The piezoelectric element 9 is supported in a cantilever manner, i.e., in such a manner that one end thereof is fixed to a lower surface of the support device 39 through the upper thin-film electrode 22, and the other end thereof is disposed as a free end. A weight member 40 is formed in a rectangular parallelepiped shape, and loaded on the other end of the piezoelectric element 9. The lower end of the support device 35 and the upper thin-film electrode 22 are electrically isolated from each other, and two lead wires 25, 26 are attached, respectively, to the lower and upper thin-film electrodes 23, 22. The analyzing device 8 is connected to the lead wires 25, 26. Thus, a potential difference between the pair of upper and lower thin-film electrodes 22, 23 is measured, and recorded in the analyzing device 8.

In this embodiment (sixth embodiment), one end of the piezoelectric element 9 is supported, and the weight member 40 is loaded on the other end of the piezoelectric element 9, so that it is possible to have the same properties as those in the second embodiment illustrated in FIG. 8.

FIG. 15 illustrates another example in which the fifth embodiment is modified to a one-end-supported (cantilevered) structure. In a leakage detector 6 according to the seventh embodiment illustrated in FIG. 15, a base 41 is formed in a hollow rectangular parallelepiped shape having a bottom wall 41a, a top wall 41b and opposed side walls 41c, 41d. One 41d of the side walls is used as a support device, instead of providing a support device on the top wall 41b. A piezoelectric element 9 is formed in the rectangular shape illustrated in FIG. 10, and one end thereof is fixed to the side wall (support device) 41d.

A pair of upper and lower thin-film electrodes 22, 23 are formed, respectively, on upper and lower surfaces of the piezoelectric element 9 by coating each of the surfaces with a silver paste. A weight member 42 is formed in a rectangular parallelepiped shape, and an upper surface of the weight member 42 is fixed to a lower surface of the lower thin-film electrode 23 at the other end of the piezoelectric element 9. The side wall 41d used as a support device and each of the upper and lower thin-film electrodes 22, 23 are electrically isolated from each other, and two lead wires 25, 26 are attached, respectively, to the lower and upper thin-film electrodes 23, 22. The analyzing device 8 is connected to the lead wires 25, 26. Thus, a potential difference between the pair of upper and lower thin-film electrodes 22, 23 is measured, and recorded in the analyzing device 8.

In this embodiment (seventh embodiment), one end of the piezoelectric element 9 is supported, and the weight member 42 is loaded against the other end of the piezoelectric element 9, so that it is possible to have the same properties as those in the second embodiment illustrated in FIG. 8.

In each of the second to seventh embodiments, only a portion of the piezoelectric element 9 is supported by the base 21, 34, 38, 41, and the weight member 28, 31, 36, 37, 40, 43 is loaded against a remaining portion of the piezoelectric element 9 which is not supported by the base 21, 34, 38, 41, so that bending deformation can be utilized. Thus, it becomes possible to easily set a resonant frequency of a system comprising the piezoelectric element 9 and the weight member 28, 31, 36, 37, 40, 43 to a desirable small value. From this point of view, each of the second to seventh embodiments is advantageous, as compared to the first embodiment in which the entire surface of the piezoelectric element 9 is supported, and the weight member 24 is loaded on the entire surface.

Figure 16:
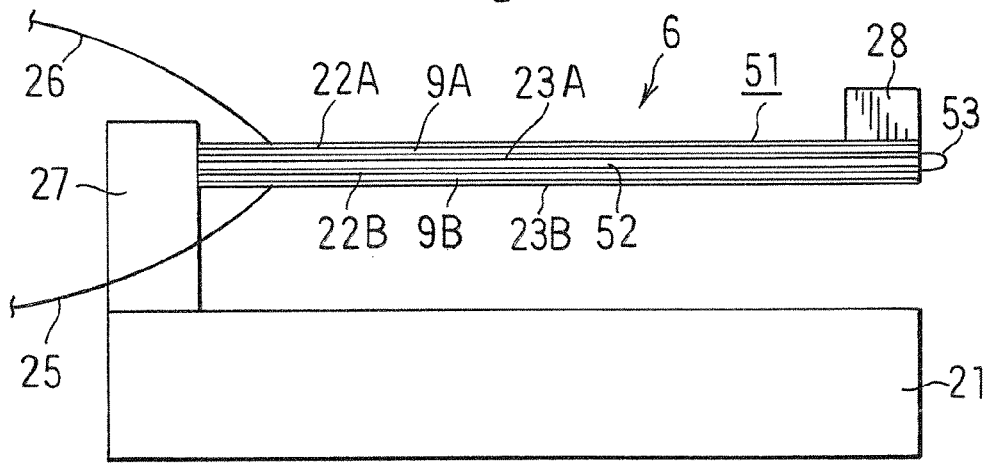
FIG. 16 is a schematic diagram illustrating a leakage detector according to an eighth embodiment of the present invention.

As illustrated in FIG. 16, a leakage detector 6 according to an eighth embodiment of the present invention comprises: a base 21 made of iron; a laminate 51 comprising upper and lower piezoelectric element layers 9A, 9B and a reinforcement layer 52 interposed between the upper and lower piezoelectric element layers 9A, 9B; a support post (support device) 27 having a lower end fixed to the base 21 and an upper end supporting the laminate 51; and a weight member 28 loaded on a non-fixed end of the laminate 51.

Thin-film electrodes 22A, 23A, 22B, 23B are formed, respectively, on upper and lower surfaces of each of the piezoelectric element layers 9A, 9B by coating each of the surfaces with a silver paste.

The support post 27 and each of the thin-film electrodes 22A, 23A, 22B, 23B are electrically isolated from each other, and two lead wires 25, 26 are attached, respectively, to the lower thin-film electrode 23B of the lower piezoelectric element layer 9B and the upper thin-film electrode 22A of the upper piezoelectric element layer 9A. The lower thin-film electrode 23A of the upper piezoelectric element layer 9A and the upper thin-film electrode 22B of the lower piezoelectric element layer 9B are connected together by an electric wire 53. The analyzing device 8 is connected to the lead wires 25, 26. Thus, a potential difference between the upper thin-film electrode 22A and the lower thin-film electrode 23B is measured, and recorded in the analyzing device 8.

In the eighth embodiment, the laminate 51 is one-end-supported (cantilevered) by the support post 27, wherein one end of the laminate 51 is supported by an upper end of the support post 27, and the weight member 28 is loaded on the other end of the laminate 51.

Each of the piezoelectric element layers 9A, 9B is formed using a stretched polyvinylidene fluoride film. One end of each of the piezoelectric element layers 9A, 9B is supported. Thus, as mentioned above, a spring constant k thereof is expressed as follows: $k=3$ $EJ/L^3$ ($J=bh^3/12$), where E: elastic constant of the piezoelectric material, J: second moment of area, L: length (dimension in a right-left direction in FIG. 16), b: width (dimension in a front-back direction of the drawing sheet in FIG. 16), and h: height (dimension in an up-down direction in FIG. 16).

A resonant frequency ($fo=\sqrt{(k/M)}/2\pi$) of a system comprising the laminate 51 and the weight member 28 is set in the range of 10 Hz to 1000 Hz. Thus, the leakage detector 6 according to the eighth embodiment is enhanced in sensitivity to vibration-sounds caused by water leakage from a synthetic resin pipe made of polyvinyl chloride or the like.

In the above leakage detector 6, each of the piezoelectric element layers 9A, 9B is laminated on the reinforcement layer 52. An effect thereof will be described with reference to FIGS. 17 and 18.

Figure 17A:
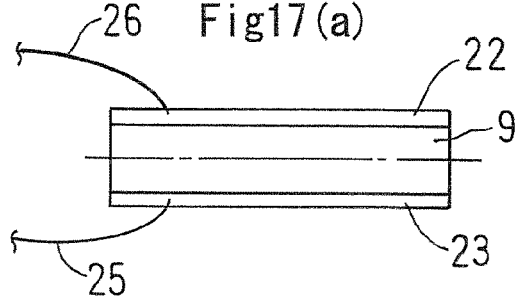
FIG. 17 is a schematic diagram illustrating an operation of a comparative example for the leakage detector according to the eighth embodiment.
Figure 17B:
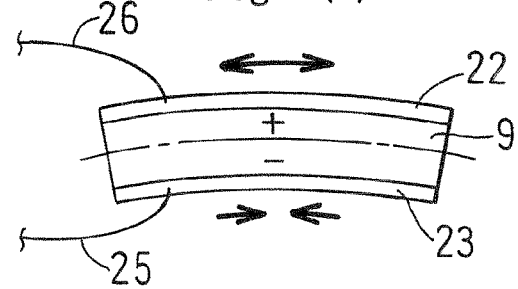
Figure 17C:
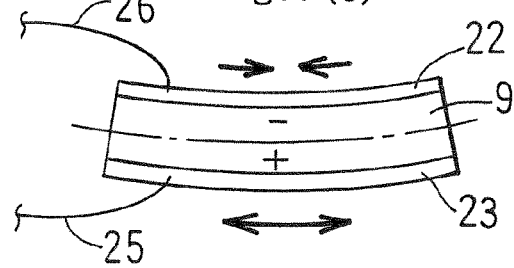

As illustrated in FIG. 17(a), in a leakage detector comprising a single layer of piezoelectric element 9 without any reinforcement layer, when vibration is applied thereto, an upwardly convexed state illustrated in FIG. 17(b) and a downwardly convexed state illustrated in FIG. 17(c) are repeated. In FIG. 17(b), an upper surface is in a tensioned state, and a lower surface is in a compressed state. On the other hand, in FIG. 17(c), the upper surface is in a compressed state, and the lower surface is in a tensioned state. As above, when a tensile stress or a compressive stress is applied in an in-plane direction of the piezoelectric element layer 9, a positive or negative potential difference according to the tension and compression is generated in a thickness direction. Thus, a magnitude of vibration can be detected by extracting the potential difference in the form of a signal.

In this case, a neutral axis of the piezoelectric element layer 9 indicated by the one-dot chain line in FIG. 17 is coincident with a center plane of the piezoelectric element layer 9 and located within a thickness of the piezoelectric element layer 9. This causes a problem that positive and negative potentials generated inside the piezoelectric element layer 9 are cancelled out, and thereby a potential difference is cancelled, causing lowering in signal intensity.

In contrast, as illustrated in FIG. 18(a), in the leakage detector in which the upper and lower piezoelectric element layers 9A, 9B are laminated, respectively, on upper and lower surfaces of the reinforcement layer 52, when vibration is applied thereto, an upwardly convexed state illustrated in FIG. 18(b) and a downwardly convexed state illustrated in FIG. 18(c) are repeated. Thus, when a tensile stress or a compressive stress is applied in an in-plane direction of the piezoelectric element layers 9A, 9B, a positive or negative potential difference according to the tension and compression is generated in a thickness direction, as with the configuration in FIG. 17. A difference of the configuration in FIG. 18 from the configuration in FIG. 17 is that a positive (or negative) potential difference is generated in the entire upper piezoelectric element layer 9A, and a negative (or positive) potential difference is generated in the entire lower piezoelectric element layer 9B, instead of the situation where positive and negative potentials are generated inside the piezoelectric element layers 9A, 9B. Thus, it becomes possible to solve the problem that positive and negative potentials generated inside the piezoelectric element layer are cancelled out, and thereby a potential difference is cancelled, causing lowering in signal intensity. Therefore, a desired potential difference can be extracted as a signal to detect a magnitude of vibration with excellent sensitivity.

That is, in the leakage detector 6 illustrated in FIG. 16, each of the upper and lower piezoelectric element layers 9A, 9B is located at a position away from a neutral axis (in this embodiment, it is coincident with a center plane of the reinforcement layer 52) of the laminate 51, so that it becomes possible to enhance a potential difference signal output (sensitivity).

In the leakage detector 6 illustrated in FIG. 16, the piezoelectric element layer 9A, 9B is provided on each of the upper and lower sides of the reinforcement layer 52. Alternatively, it may be provided on either one of the upper or lower sides of the reinforcement layer 52. Further, in FIG. 16, each of the upper and lower piezoelectric element layers 9A, 9B is depicted as a single layer. However, each of the piezoelectric element layers 9A, 9B is not limited to a layer formed of a single film-shaped piezoelectric element. Preferably, it is formed by laminating a plurality of film-shaped piezoelectric elements.

In either case, a longer distance between the neutral axis of the laminate 51 and each of the upper and lower piezoelectric element layers 9A, 9B is better. A distance between the neutral axis and a boundary surface of each of the upper and lower piezoelectric element layers 9A, 9B with respect to the reinforcement layer 52 is preferably set to 1/10 or more, more preferably, 1/6 or more, of a total thickness of the laminate 51.

Figure 21:
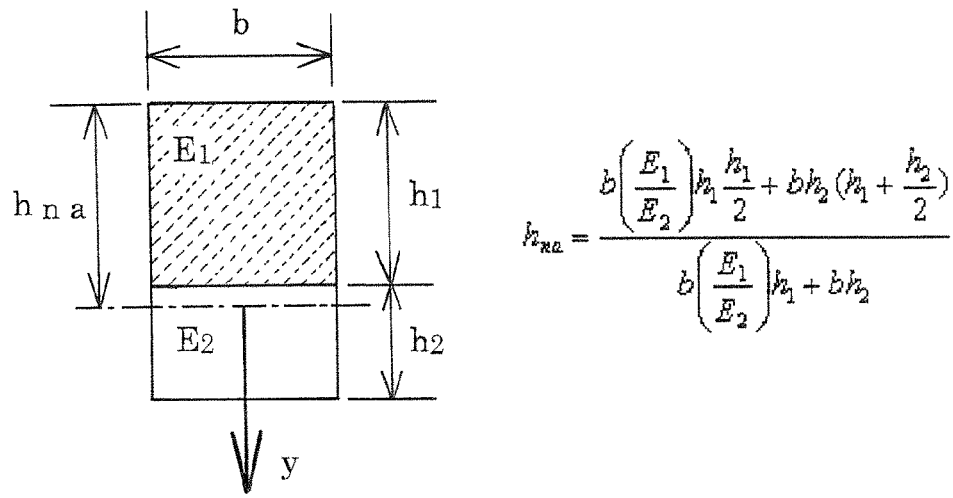
FIG. 21 is a diagram illustrating a method of calculating a neutral axis in the leakage detector according to the eighth embodiment.

Regarding the neutral axis of the laminate 51, as illustrated in FIG. 21, on the assumption that an elastic modulus and a thickness of each of the piezoelectric element layers 9A, 9B are represented, respectively, as E1 and h1, and an elastic modulus and a thickness of the reinforcement layer 52 are represented, respectively, as E2 and h2, a distance hna between the upper surface and the neutral axis of the laminate 51 is calculated by the following formula:

$$hna=\{(E1/E2)h1(h1/2)+h2(h1+h2/2)\}/\{(E1/E2)h1+h2\}$$

In the case where a plurality of film-shaped piezoelectric elements are laminated, a plurality of film-shaped piezoelectric elements each having two thin-film electrodes formed, respectively, on upper and lower surfaces thereof may be laminated one after another, while interposing an insulating layer therebetween, and a lead wire may be provided in each of a set of two piezoelectric element layers corresponding in an up-down direction to extract a signal.

In the case where a plurality of film-shaped piezoelectric elements are laminated, as illustrated in FIG. 19 (ninth embodiment), a film-shaped piezoelectric element formed in a relatively elongated size and provided with a thin-film electrode on each of upper and lower surfaces thereof may be accordion-folded to form a multi-layered structure comprising three-layered film-shaped piezoelectric element sections 9a, 9b, 9c with thin-film electrode sections 22a, 22b, 22c. Lead wires 25, 26 are provided to connect an uppermost thin-film electrode section 22a and a lowermost thin-film electrode section (i.e., a thin-film electrode section located on a back side of the thin-film electrode section indicated by the reference sign 22c). In this case, the thin-film electrode section indicated by the reference sign 22b and the thin-film electrode section indicated by the reference sign 22c are superimposed on each other. However, the superimposed thin-film electrode sections do not undergo short-circuiting, because they are originally a part of the thin-film electrode located on the same side of the piezoelectric element 9. Thus, it becomes possible to eliminate a need for an insulating layer and a need to electrically connect respective folded thin-film electrode sections, to thereby readily obtain the multi-layered structure, as compared to the case where a plurality of film-shaped piezoelectric elements are laminated one after another, while interposing an insulating layer therebetween.

Figure 20:
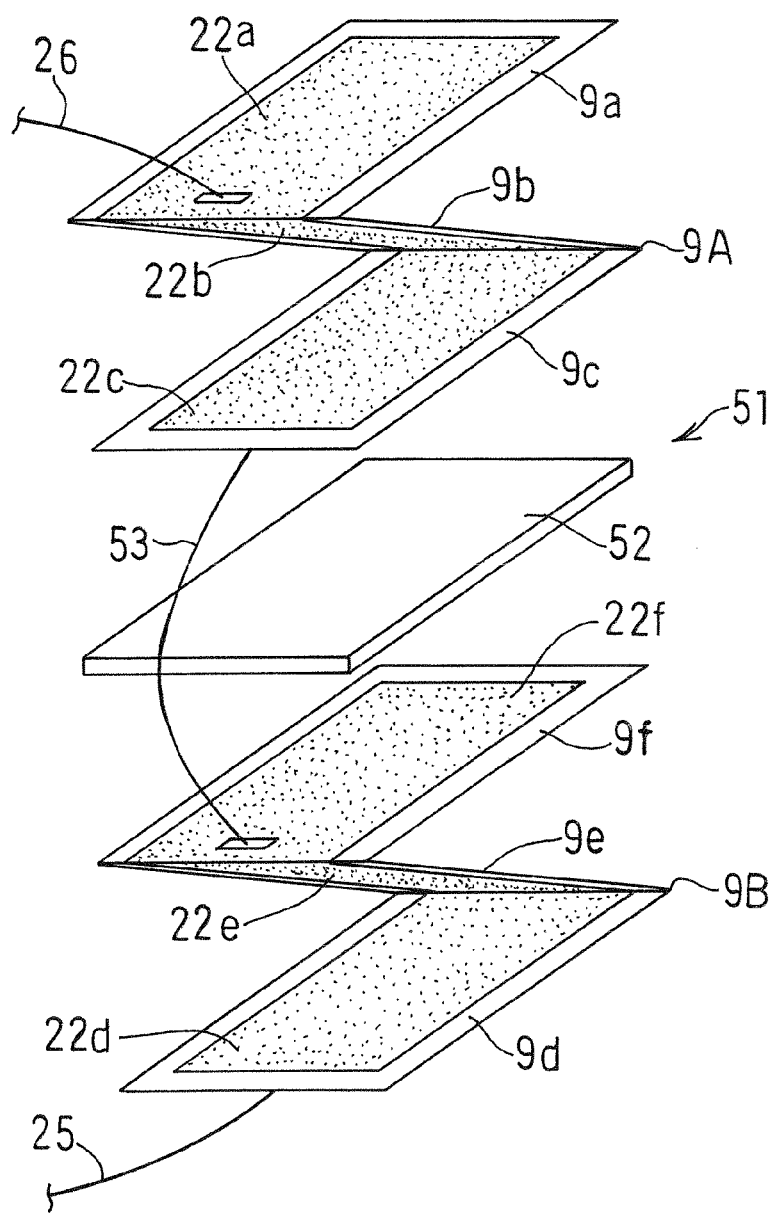
FIG. 20 is a schematic diagram illustrating a leakage detector according to a tenth embodiment of the present invention.

FIG. 20 illustrates a configuration in which two multi-layered structures each comprising the accordion-folded three-layered film-shaped piezoelectric element sections 9a, 9b, 9c illustrated in FIG. 19 are arranged symmetrically in an up-down direction with respect to the center plane of the reinforcement layer 52 (tenth embodiment).

In FIG. 20, a thin-film electrode section on a lower surface of the film-shaped piezoelectric element section 9c in contact with the reinforcement layer 52 (a thin-film electrode section on a back side of the thin-film electrode section indicated by the reference sign 22c), in the upper piezoelectric element layer 9A, and a thin-film electrode section 22f on an upper surface of the film-shaped piezoelectric element section 9f in contact with the reinforcement layer 52, in the lower piezoelectric element layer 9B, are originally respective parts of the thin-film electrodes located on the same side in the two elongated piezoelectric element films. These thin-film electrode sections are connected together by an electric wire 53. Further, a thin-film electrode section 22a on an upper surface of the uppermost film-shaped piezoelectric element section 9a in the upper piezoelectric element layer 9A, and a thin-film electrode section on a lower surface of the lowermost film-shaped piezoelectric element section 9d, (a thin-film electrode section on a back side of the thin-film electrode section indicated by the reference sign 22d), in the lower piezoelectric element layer 9B, are originally respective parts of the thin-film electrodes located on the same side in two elongated piezoelectric element films, and are located on respective opposite sides of the thin-film electrode sections connected by the electric wire 53. Lead wires 25, 26 are connected to them, respectively.

In the tenth embodiment, a film-shaped piezoelectric element is accordion-folded into a plurality of sections 9a, 9b, 9c, 9d, 9e, 9f to allow the thin-film electrode sections 22b, 22c, 22d, 22e to be free from short-circuiting, so that it becomes possible to eliminate a need for an insulating layer, and it is only necessary to connect the uppermost and lowermost thin-film electrode sections. Thus, the multi-layered structure can be readily obtained.

In each of the leakage detectors 6 according to the eighth to tenth embodiments, only a portion of the laminate 51 comprising the piezoelectric element layers 9A, 9B and the reinforcement layer 52 is supported by the base 21, and the weight member 28 is loaded against a remaining portion of the laminate 51 which is not supported by the base 21, so that it becomes possible to lower the resonant frequency as with the second embodiment and others.

Then, in the leakage detector configured such that one end or both ends of the piezoelectric element are supported, the resonant frequency can be set to a desired value by using the above calculation formula for the spring constant and the above calculation formula for the resonant frequency.

Preferably, the resonant frequency of the system comprising the piezoelectric element and the weight member is set in the range of 10 Hz to 1000 Hz. When the leakage detector is configured such that only a portion of the piezoelectric element is supported by the base, and the weight member is loaded against a remaining portion of the piezoelectric element which is not supported by the base, it becomes easier to set the resonant frequency to 1000 Hz or less. This setting allows the above leakage detector 6 to become suitable for fluid leakage inspection of a synthetic resin pipe.

Instead of the above configuration (equivalent to that in the second embodiment) for causing the piezoelectric element to undergo a bending deformation, various other configurations equivalent to those in the third to seventh embodiments may be employed.

As one example (Example 1) of the leakage detector illustrated in FIG. 19, the reinforcement layer 52 was formed as a PET sheet having a length (dimension in the right-left direction in FIG. 16) of 40 mm, a width (dimension in the front-back direction of the drawing sheet in FIG. 16) of 25 mm, and a thickness of 700 µm, and the piezoelectric element layer 9 was formed by laminating a PVDF film having a thickness of 110 µm, in a three-ply manner. The thin-film electrodes were provided on the piezoelectric element layer 9. As a result, a thickness per ply in the piezoelectric element layer 9 was 122 µm.

The piezoelectric element layer 9a, 9b, 9c with the thin-film electrodes 22a, 22b, 22c had a bending elastic modulus of 21 GPa, and the reinforcement layer 52 had a bending elastic modulus of 3.0 GPa. The weight member 28 was set to have a mass of 1.2 g.

A thickness of the piezoelectric element layer 9 was 366 µm as a total thickness of the three layers, and a total thickness of the laminate 51 was 1066 µm. In this example, by using the relationship illustrated in FIG. 21, the neural axis is calculated as a position apart from the upper surface of the laminate 51 by 673 µm. This position is located inside the reinforcement layer 52 composed of the PET sheet. The neutral axis of the laminate 51 is located away from the lower surface of the piezoelectric element layer 9 by 207 µm. This distance is equivalent to about ⅕ of the thickness of the laminate 51.

The leakage detector in the Example 1 can obtain a signal having an intensity required for detection of water leakage sound as illustrated in FIG. 24.

As one example (Example 2) of the leakage detector illustrated in FIG. 20, the reinforcement layer 52 was formed in the same manner as that in the Example 1, and each of the upper and lower piezoelectric element layers 9A, 9B was cut out from the same film as that in the Example 1. Thus, a total thickness of the laminate 51 is 1432 µm. The neutral axis is located at a position away from the upper surface of the laminate 51 by 716 µm, i.e., inside the reinforcement layer 52 (composed of the PET sheet). The neutral axis of the laminate 51 is located away from an interface between the reinforcement layer 52 and each of the piezoelectric element layers 9A, 9B by 350 µm. This distance is equivalent to about ¼ of the thickness of the laminate 51.

The leakage detector in the Example 2 can obtain a signal having an intensity required for detection of water leakage sound as illustrated in FIG. 24, and can obtain a larger signal as compared to the Example 1.

The leakage detector 6 according to each of the eighth to tenth embodiments is capable of, by utilizing bending deformation for vibration, easily setting a resonant frequency of a system comprising the piezoelectric element layer 9A, 9B and the weight member 28 to a desirable small value. Specifically, the leakage detector 6 according to each of the eighth to tenth embodiments is capable of recording a large signal in a frequency band on a lower frequency side with respect to 1000 Hz, so that it is enhanced in sensitivity to vibration-sounds caused by water leakage from a synthetic resin pipe made of polyvinyl chloride or the like, which has heretofore been hardly realizable. In the case of utilizing bending deformation, a leakage detector simply having a piezoelectric element layer, a compressive stress and a tensile stress are cancelled out inside the piezoelectric element layer. In contrast, in the configuration where the piezoelectric element layers 9A, 9B and the reinforcement layer 52 are formed as a laminate 51, each of the piezoelectric element layers 9A, 9B can be set at a position away from the neutral axis of the laminate 51, and only one of the compressive stress and the tensile stress is generated inside either one of the upper and lower piezoelectric element layers 9A, 9B, so that it becomes possible to significantly increase the sensitivity.

Thus, this leakage detector 6 can be used to enhance the sensitivity to vibration-sounds caused by fluid leakage from a synthetic resin pipe, and set the installation span longer, so that it becomes possible to more efficiently perform a water leakage inspection for a synthetic resin pipe.

Figure 22:
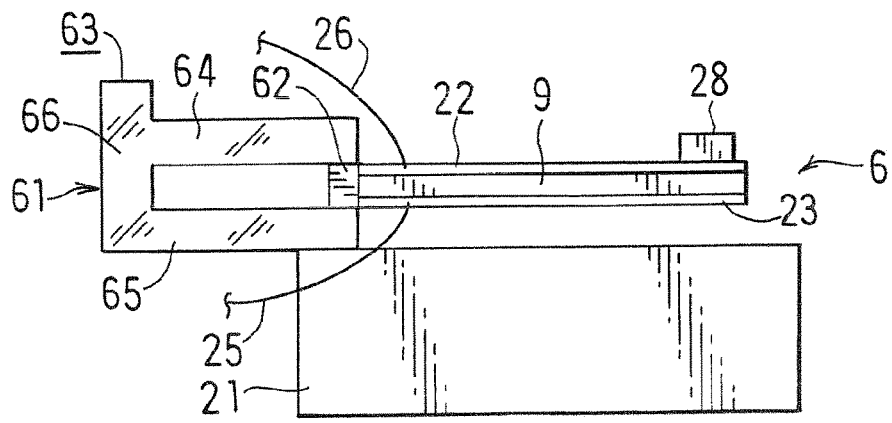
FIG. 22 is a schematic diagram illustrating a leakage detector according to an eleventh embodiment of the present invention.
Figure 23:
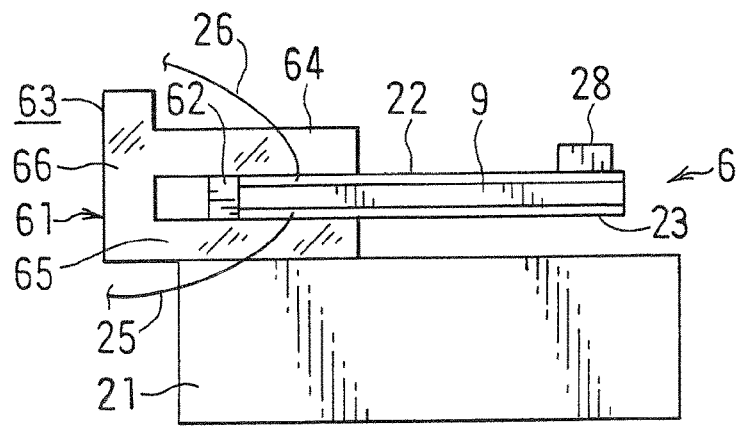
FIG. 23 is a schematic diagram illustrating a state of the leakage detector after a slider is displaced from a position in FIG. 22.

FIGS. 22 and 23 illustrate a leakage detector 6 according to an eleventh embodiment of the present invention. The leakage detector 6 comprises: a base 21 made of iron; a film-shaped piezoelectric element 9 located above the base 21; a support device 61 supporting the piezoelectric element 9; a pair of upper and lower thin-film electrodes 22, 23 formed, respectively, on upper and lower surfaces of the piezoelectric element 9 by coating each of the surfaces with a silver paste; and a weight member 28 loaded on the upper thin-film electrode 22.

The support device 61 comprises a support post 62 having a lower end fixed to the base 21 and an upper end supporting the piezoelectric element 9, and a slider 63 configured to be displaced above and along the base 21.

The tenth embodiment is constructed by adding the slider 63 to the second embodiment illustrated in FIG. 8.

The support post 62 and each of the upper and lower thin-film electrodes 22, 23 are electrically isolated from each other, and two lead wires 25, 26 are attached, respectively, to the lower and upper thin-film electrodes 15, 14. The analyzing device 8 is connected to the lead wires 25, 26. Thus, a potential difference between the upper thin-film electrode 22 and the lower thin-film electrode 23 is measured, and transmitted to the analyzing device 8.

As with the second embodiment, the piezoelectric element 9 is one-end-supported (cantilevered) by the support post 62, wherein one end of the piezoelectric element 9 is supported by an upper end of the support post 62, and the weight member 28 is loaded on the other end of the piezoelectric element 9.

The slider 63 comprises: upper and lower clamping plates 64, 65 disposed in opposed relation to each other in such a manner as to clamp a portion of the one-end-supported (cantilevered) piezoelectric element 9 and thin-film electrodes 22, 23 on a side close to the support post 62, from thereabove and therebelow; and a coupling plate 66 coupling the upper and lower clamping plates 64, 65 together.

In order to enhance the sensitivity to vibration-sounds caused by fluid leakage from a synthetic resin pipe 3, it is desirable to allow for measurement of a signal a low frequency region which is distinctive vibration of a synthetic resin pipe 3. From this point of view, a one-end-supported (cantilevered) structure can be employed to obtain enhanced sensitivity to vibration-sounds caused by fluid leakage from a synthetic resin pipe 3. Thus, in the pipe network monitoring apparatus 1, the installation span of the leakage detector 6 can be set longer, so that it becomes possible to more efficiently perform a water leakage inspection for the synthetic resin pipe 3.

When the slider 63 is at an initial position illustrated in FIG. 22, it is located away from the piezoelectric element 9. The slider 63 is configured to be moved from the initial position illustrated in FIG. 22 in a rightward direction in FIGS. 22 and 23. During this movement, it can be displaced above and along the base 21, while clamping the portion of the piezoelectric element 9 and thin-film electrodes 22, 23 adjacent to the support post 62, from thereabove and therebelow as illustrated in FIG. 23. As a result, a length of a supported portion of the piezoelectric element 9 becomes longer, and thereby a length of a one-end-supported (cantilevered) beam (i.e., the length L in the aforementioned formula) becomes shorter.

Thus, the leakage detector 6 is configured to have a variable resonant frequency, wherein, when the slider 63 is at the initial position illustrated in FIG. 22, the leakage detector 6 has a minimum value of the resonant frequency, i.e., the same resonant frequency as that of the leakage detector 6 illustrated in FIG. 8, and, as the slider 63 is gradually displaced rightwardly, the resonant frequency becomes higher.

A peak frequency of leakage vibration-sounds caused by leakage from a pipe varies depending on a material and a bore diameter of the pipe. For example, a synthetic resin pipe tends to have a lower resonant frequency, as compared to a metal pipe, and the resonant frequency tends to become lower along with an increase in the bore diameter. For example, pipes made of vinyl chloride and formed to have a bore diameter of φ 75 mostly have a peak leakage frequency in the range of 10 to 200 Hz, and pipes made of cast iron and formed to have a bore diameter of φ 75 mostly have a peak leakage frequency in the range of 300 to 500 Hz. Further, pipes made of cast iron and formed to have a bore diameter of φ 250 mostly have a peak leakage frequency in the range of 100 to 300 Hz. Although the peak leakage frequency largely varies, the aforementioned leakage detector 6 can be used to variably change a length of the beam by utilizing a resonance phenomenon in a mechanical manner depending on a material and a bore diameter of a pipe to thereby freely control the resonant frequency.

In the case where a target pipe to be monitored includes a pipe made of vinyl chloride and formed to have a bore diameter of φ 75, and a pipe made of cast iron and formed to have a bore diameter of φ 75 to φ 250, the resonant frequency of the leakage detector 6 may be set to 150 Hz or less, when a distance between a support point supported by the support device 61 and a load point of the weight member 28 is maximized (in the state in FIG. 22), and set to 400 Hz or more, when the distance between the support point supported by the support device 61 and the load point of the weight member 28 is minimized (in a state in which the slider 63 is further displaced rightwardly from the position in FIG. 23 and the coupling plate 66 comes into contact with the support post 62).

The piezoelectric element 9 of the leakage detector 6 was prepared to have a thickness of 2 mm, a length of 60 mm and a width of 25 mm, the elastic modulus of the beam and the weight of the weight member 28 were set, respectively, to 3 GPa and 1 g (Example 3). In this case, the resonance frequency of the leakage detector 6 in the state illustrated in FIG. 22 is calculated to be 133 Hz. When the leakage detector 6 is set in the state illustrated in FIG. 23 to change the length of the beam to 35 mm, the resonant frequency is changed to 298 Hz. Further, when the length of the beam is changed to 25 mm, the resonant frequency is changed to 493 Hz.

In the Example 3, irrespective of whether the target pipe is a pipe made of vinyl chloride and formed to have a bore diameter of φ 75, or a pipe made of cast iron and formed to have a bore diameter of φ 75, or a pipe made of cast iron and formed to have a bore diameter of φ 250, leakage frequencies thereof fall within a variable range of the resonant frequency of the leakage detector 6, so that it is possible to cope with such a situation by changing the resonant frequency.

A minimum value of the resonant frequency, i.e., the variable range, of the leakage detector 6, can be changed by changing one or more of the thickness, length, width and elastic modulus of the piezoelectric element 9, and the weight of the weight member 28. As above, the leakage detector 6 according to this embodiment is capable of performing detection of fluid leakage in various pipe members, while changing the resonant frequency thereof, using the same leakage detector 6.

The leakage detectors according to the above embodiments are suitably usable for: detecting water leakage from a tap water pipe arrangement; detecting water leakage from various pipelines other than a tap water pipeline; and detecting leakage of a fluid, such as a drug solution, from a pipeline for industrial chemical solutions or the like.

INDUSTRIAL APPLICABILITY

The present invention makes it possible to accurately detect fluid leakage in various pipelines including tap water pipeline, building pipeline and industrial pipeline, to thereby enhance accuracy in flow rate monitoring, abnormality detection or the like in such pipelines.

What is claimed is:

1. A leakage detector for detecting vibration-sounds caused by fluid leakage from a pipeline, comprising a base, a piezoelectric element supported by the base and configured to convert vibration-sounds to an electric signal, and a weight member loaded against the piezoelectric element,
wherein the piezoelectric element is made of a polymeric piezoelectric material,
wherein the leakage detector is configured to allow a distance between a support point of the piezoelectric element, supported by a support device, and a load point of the piezoelectric element, loaded by the weight member, to be variably changed in a mechanical manner by a slider to thereby allow the resonant frequency of a system comprising the piezoelectric element and the weight member to be variably changed, and wherein a resonance frequency of the system comprising the piezoelectric element and the weight member is set in a range of 10 Hz to 1000 Hz.

2. The leakage detector as defined in claim 1, wherein the piezoelectric element is formed as a cantilever, and wherein a portion of the piezoelectric element is supported by the base, and the weight member is loaded against a remaining portion of the piezoelectric element which is not supported by the base.

3. The leakage detector as defined in claim 1, wherein the piezoelectric element comprises a stretched polyvinylidene fluoride film.

4. A leakage detection method comprising installing the leakage detector as defined in claim 1 in a vicinity of a pipe member, and detecting vibration caused by fluid leakage from the pipe member, to thereby determine the presence or absence of the fluid leakage.

5. The leakage detector according to claim 1, wherein the resonant frequency of the system comprising the piezoelectric element and the weight member is set in a range of 10 Hz to 150 Hz or 400 Hz to 1000 Hz.

6. The leakage detector according to claim 1, wherein the pipeline is constructed of a synthetic resin, and the resonant frequency of the system comprising the piezoelectric element and the weight member is set in a range of 10 Hz to 150 Hz.

7. The leakage detector according to claim 1, wherein the pipeline is constructed of a metal, and the resonant frequency of the system comprising the piezoelectric element and the weight member is set in a range of 400 Hz to 1000 Hz.

8. The leakage detector as defined in claim 1, wherein the piezoelectric element is laminated on at least one of upper or lower surfaces of a reinforcement layer.

9. The leakage detector as defined in claim 8, wherein the piezoelectric element comprises a plurality of film-shaped piezoelectric elements, provided with a thin-film electrode on each of upper and lower sides thereof, that are accordion-folded to form a multi-layered structure comprising three layers.

10. A pipe network monitoring apparatus comprising:
a plurality of leakage detectors each mounted, respectively, at a plurality of locations of a pipe network comprised of pipes and joints, and configured to convert a pressure fluctuation along with movement of a fluid through a pipeline to an electric charge signal;
a plurality of communication devices each configured to transmit the electric charge signal obtained by a respective one of the leakage detectors; and
a display device configured to receive and display information transmitted from the communication devices, at a remote location,
wherein each of the leakage detectors comprises a base, a piezoelectric element supported by the base and configured to convert vibration-sounds to an electric signal, and a weight member loaded against the piezoelectric element, wherein the piezoelectric element is made of a polymeric piezoelectric material, and wherein each of the leakage detectors are configured to allow a distance between a support point of the piezoelectric element, supported by a support device, and a load point of the piezoelectric element, loaded by the weight member, to be variably changed in a mechanical manner by a slider to thereby allow the resonant frequency of a system comprising the piezoelectric element and the weight member to be variably changed, wherein further, a resonant frequency of a system comprising the piezoelectric element and the weight member is set in a range of 10 Hz to 1000 Hz.

11. A leakage detector for detecting vibration-sounds caused by fluid leakage from a pipeline, comprising a base, a piezoelectric element supported by the base and configured to convert vibration-sounds to an electric signal, and a weight member loaded against the piezoelectric element, wherein the piezoelectric element is made of a polymeric piezoelectric material, wherein a resonance frequency of a system comprising the piezoelectric element and the weight member is set in a range of 10 Hz to 1000 Hz, wherein the piezoelectric element is laminated on at least one of upper or lower surfaces of a reinforcement layer, and wherein the piezoelectric element comprises a plurality of film-shaped piezoelectric elements, provided with a thin-film electrode on each of upper and lower sides thereof, that are accordion-folded to form a multi-layered structure comprising three layers.

12. A pipe network monitoring apparatus comprising:
a plurality of leakage detectors according to claim 11, the plurality of leakage detectors each mounted, respectively, at a plurality of locations of a pipe network comprised of pipes and joints, and configured to convert a pressure fluctuation along with movement of a fluid through a pipeline to an electric charge signal;
a plurality of communication devices each configured to transmit the electric charge signal obtained by a respective one of the leakage detectors; and
a display device configured to receive and display information transmitted from the communication devices, at a remote location.

13. The leakage detector as defined in claim 11, wherein the piezoelectric element is formed as a cantilever, and wherein a portion of the piezoelectric element is supported by the base, and the weight member is loaded against a remaining portion of the piezoelectric element which is not supported by the base.

14. The leakage detector as defined in claim 11, wherein the piezoelectric element comprises a stretched polyvinylidene fluoride film.

15. A leakage detection method comprising installing the leakage detector as defined in claim 11 in a vicinity of a pipe member, and detecting vibration caused by fluid leakage from the pipe member, to thereby determine the presence or absence of the fluid leakage.

16. The leakage detector according to claim 11, wherein the resonant frequency of the system comprising the piezoelectric element and the weight member is set in a range of 10 Hz to 150 Hz or 400 Hz to 1000 Hz.

17. The leakage detector according to claim 11, wherein the pipeline is constructed of a synthetic resin, and the resonant frequency of the system comprising the piezoelectric element and the weight member is set in a range of 10 Hz to 150 Hz.

18. The leakage detector according to claim 11, wherein the pipeline is constructed of a metal, and the resonant frequency of the system comprising the piezoelectric element and the weight member is set in a range of 400 Hz to 1000 Hz.

\* \* \* \* \*